United States Patent
Rahman et al.

(10) Patent No.: US 10,420,028 B2
(45) Date of Patent: Sep. 17, 2019

(54) HANDLING INTERRUPTIONS DURING DRX ON DURATIONS

(71) Applicant: TELEFONAKTIEBOLAGET LM ERICSSON (PUBL), Stockholm (SE)

(72) Inventors: Imadur Rahman, Sollentuna (SE); Muhammad Kazmi, Sundbyberg (SE); Christopher Callender, Kinross (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 15/537,277

(22) PCT Filed: Dec. 14, 2015

(86) PCT No.: PCT/IB2015/059595
§ 371 (c)(1),
(2) Date: Jun. 16, 2017

(87) PCT Pub. No.: WO2016/097978
PCT Pub. Date: Jun. 23, 2016

(65) Prior Publication Data
US 2017/0367045 A1    Dec. 21, 2017

Related U.S. Application Data

(60) Provisional application No. 62/093,245, filed on Dec. 17, 2014.

(51) Int. Cl.
H04W 52/02    (2009.01)
H04W 76/28    (2018.01)
H04W 76/15    (2018.01)

(52) U.S. Cl.
CPC ....... *H04W 52/0216* (2013.01); *H04W 76/15* (2018.02); *H04W 76/28* (2018.02);
(Continued)

(58) Field of Classification Search
None
See application file for complete search history.

(56) References Cited

U.S. PATENT DOCUMENTS

2013/0044674 A1* 2/2013 Teyeb ............... H04B 7/15542
370/315
2013/0150018 A1* 6/2013 Su ....................... H04B 1/0067
455/419

(Continued)

FOREIGN PATENT DOCUMENTS

WO    2015/172057 A1    11/2015

OTHER PUBLICATIONS

Huawei, et al: "Further analysis on interruption in dual connectivity," 3GPP draft; R4-146020, Singapore; Sep. 29, 2014.
(Continued)

*Primary Examiner* — Kevin C. Harper
*Assistant Examiner* — Derrick V Rose

(57) ABSTRACT

In some embodiments, a method of multi-connectivity operation of a wireless device in Discontinuous Reception (DRX) comprises determining whether a first DRX ON duration in a first DRX cycle configured for use by the wireless device in a first Cell Group (CG) for multi-connectivity operation and a second DRX ON duration in a second DRX cycle configured for use by the wireless device in a second CG for multi-connectivity operation partially overlap in time with one another. The method further comprises, upon determining that the first DRX ON duration and the second DRX ON duration partially overlap, taking one or more actions that mitigate the partial overlap between the first DRX ON duration in the first DRX cycle and the second ON duration in the second DRX cycle. By avoiding partial overlap, interruptions at the wireless device as a result of transitioning between DRX states can be mitigated or avoided.

21 Claims, 21 Drawing Sheets

(52) U.S. Cl.
CPC ...... *Y02D 70/1226* (2018.01); *Y02D 70/1262* (2018.01); *Y02D 70/142* (2018.01); *Y02D 70/20* (2018.01); *Y02D 70/21* (2018.01); *Y02D 70/23* (2018.01); *Y02D 70/24* (2018.01); *Y02D 70/25* (2018.01)

(56) References Cited

U.S. PATENT DOCUMENTS

| | | | | |
|---|---|---|---|---|
| 2015/0195867 A1* | 7/2015 | Koc | ............ | H04W 88/06 370/311 |
| 2015/0250017 A1* | 9/2015 | Ingale | ............ | H04B 7/2615 370/280 |
| 2015/0358957 A1* | 12/2015 | Kim | ............ | H04W 16/32 455/450 |

OTHER PUBLICATIONS

Intel Corporation: "Interruption requirements in Dual connectivity," 3GPP draft; R4-147705, San Francisco, CA, US; Nov. 17, 2014.
Broadcom Corp: "Coordinated DRX for Dual Connectivity," 3GPP draft; R2-133998; San Francisco, CA, US; Nov. 13, 2013.
Intel Corporation: "DRX allignment for dual connected UEs," 3GPP draft; R2-141205; Valencia, Spain; Mar. 22, 2014.
Ericsson: "Unsynchronized dual connectivity operation," 3GPP draft; R4-71AH-0034; Beijing, China; Jun. 18, 2014.

* cited by examiner

HANDLING INTERRUPTIONS DURING DRX ON DURATIONS

RELATED APPLICATIONS

This application claims the benefit of provisional patent application Ser. No. 62/093,245, filed Dec. 17, 2014, the disclosure of which is hereby incorporated herein by reference in its entirety.

TECHNICAL FIELD

This disclosure pertains to handling interruptions during Discontinuous Reception (DRX) mode ON durations, and more particularly, to handling interruptions during DRX ON durations for multi-connectivity (e.g., dual-connectivity) operation.

BACKGROUND

A Dual Connectivity (DC) framework is currently being considered for Third Generation Partnership Project (3GPP) Long Term Evolution (LTE) Release 12 (Rel-12). DC refers to the operation where, while in a connected state (RRC_CONNECTED), a given User Equipment (UE) consumes radio resources provided by at least two different network points, namely a Master enhanced or evolved Node B (eNB) (MeNB) and Secondary eNB (SeNB), connected via a non-ideal backhaul connection. A UE in DC maintains simultaneous connections to an "anchor node" and a "booster node," where the MeNB is interchangeably referred to herein as the anchor node and the SeNB is interchangeably referred to herein as the booster node. As the name implies, the MeNB controls the connection and handover of the SeNB. No SeNB standalone handover is defined for LTE Rel-12. Signaling in the MeNB is needed even in SeNB change. Both the anchor node and the booster node can terminate the control plane connection towards the UE and can thus be the controlling nodes of the UE.

The UE reads system information from the anchor node. In addition to the anchor node, the UE may be connected to one or several booster nodes for added user plane support. The MeNB and the SeNB are connected via the Xn interface, which is currently selected to be the same as the X2 interface between two eNBs.

More specifically, DC is a mode of operation of a UE in RRC_CONNECTED state in which the UE is configured with a Master Cell Group (MCG) and a Secondary Cell Group (SCG). A Cell Group (CG) is a group of serving cells associated with either the MeNB or the SeNB, respectively. The MCG and the SCG are defined as follows:

The MCG is a group of serving cells associated with the MeNB, comprising of a Primary Cell (PCell) and optionally one or more Secondary Cells (SCells).

The SCG is a group of serving cells associated with the SeNB comprising of a Primary SCell (pSCell) and optionally one or more SCells.

The MeNB is the eNB which terminates at least S1 Mobility Management Entity (MME). The SeNB is the eNB that is providing additional radio resources for the UE but is not the MeNB.

The anchor node (MeNB) and the booster node (SeNB) roles are defined from a UE point of view, which means that a node that acts as an anchor node to one UE may act as booster node to another UE. Similarly, though the UE reads the system information from the anchor node, a node acting as a booster node to one UE may or may not distribute system information to another UE. The MeNB provides system information, terminates the control plane, and can terminate the user plane. The SeNB can terminate the control plane and does terminate the user plane. In some cases, the SeNB terminates only the user plane.

In one application, DC allows a UE to be connected to two network nodes to receive data from both network nodes to increase its data rate. This user plane aggregation achieves similar benefits as Carrier Aggregation (CA), but uses network nodes that are not connected by a low-latency backhaul/network connection. Due to this lack of low-latency backhaul, the scheduling and Hybrid Automatic Repeat Request (HARQ) Acknowledgement (ACK) feedback from the UE to each of the network nodes will need to be performed separately. That is, it is expected the UE shall have two uplink transmitters to transmit uplink control and data to the connected network nodes. In a typical scenario, the dual links with the MeNB and the SeNB belong to different carrier frequencies and even different frequency bands.

Since DC operation involves two non-co-located transmitters (i.e., the MeNB and the SeNB), one of the main issues related to UE receiver performance is the maximum receive timing difference ($\Delta t$) of the signals from the MeNB and the SeNB received at the UE receiver. This gives rise to two cases of DC operation with respect to the UE: synchronized DC operation and unsynchronized DC operation.

As used herein, synchronized DC operation means that the UE can perform DC operation provided the receive timing difference ($\Delta t$) between the signals received at the UE from the Component Carriers (CCs) belonging to the MCG and the SCG are within a certain threshold, e.g. ±33 microseconds ($\mu s$). As a particular example, synchronized DC operation means that the receive timing difference ($\Delta t$) between the signals received at the UE from the subframe boundaries of the CCs belonging to the MCG and the SCG are within a certain threshold, e.g. ±33 $\mu s$.

As used herein, unsynchronized DC operation means that the UE can perform DC operation regardless of the receive timing difference ($\Delta t$) between the signals received at the UE from the CCs belonging to the MCG and the SCG, i.e. for any value of $\Delta t$. As a particular example, unsynchronized DC operation means that the receive timing difference ($\Delta t$) between the signals received at the UE from the subframe boundaries of the CCs belonging to the MCG and the SCG can be any value, e.g. more than ±33 $\mu s$, any value up to ±0.5 milliseconds (ms), etc.

The maximum receive timing difference ($\Delta t$) at the UE consists of the following main components:

(1) Relative propagation delay, which is expressed as the difference of propagation delay between the MeNB and the SeNB, and (2) Transmit (Tx) timing difference due to synchronization levels between antenna connectors of the MeNB and the SeNB.

In operation, the UE signals its capability to a network node (e.g., the MeNB) indicating whether the UE is capable of synchronized and/or unsynchronized dual connectivity operation. The capability information is associated with each band or band combination supported by the UE for DC operation, e.g. the UE may indicate it supports synchronized and unsynchronized DC operation for frequency band combinations: band 1+band 3 and band 7+band 8, respectively. Based on this received UE capability information, the network node can determine whether the UE should be configured in synchronized or unsynchronized DC operation for a particular band combination.

The UE capable of CA is required to handle a maximum received time difference of signals from non-co-located serving cells (e.g., PCell and SCell) of 30.26 µs. The value of 30.26 µs corresponds to signal propagation distance of just over nine kilometers (km) considering the speed of light in free space is $3\times10^8$ m/s. In dense urban scenarios, maximum time misalignment due to multipath propagation delay is around 10 µs. This misalignment is linearly related to relative physical distance between the network nodes serving the cells from which the received time difference of signals is measured by the UE. So, there is a large amount of timing misalignment margin that may not be caused only due to distance between the network nodes. This means that there is a possibility to allow the UE to handle maximum received time difference of signals larger than 30.26 µs. For example, this can be relaxed by certain transmit timing misalignment between the network nodes (i.e., synchronization accuracy between the MeNB and the SeNB), e.g. 3 µs. Three microseconds is chosen here due to the fact that co-channel synchronization accuracy requirement for Time Division Duplexing (TDD) systems is 3 µs (which means that the tightest requirement that can be achieved is 3 µs).

The synchronized DC case essentially means that the MeNB and the SeNB transmit timing needs to be synchronized up to a certain level of time accuracy, while the unsynchronized DC case provides a random value for synchronization accuracy (i.e., anything up to 1 ms), which is higher than the accuracy required in the synchronized DC case. It is worth noting here that the received time difference, which we refer to here as $\Delta t$, is the received timing misalignment between two received signals from subframe boundaries of the MeNB and the SeNB at the UE. In other words, the receive timing difference ($\Delta t$) is not the transmit timing mismatch levels between the MeNB and the SeNB.

As the baseline option, since dual Transmitter (Tx)/Receive (Rx) is assumed, as is non-ideal backhaul, it is reasonable to assume that the MeNB and the SeNB are not synchronized to each other. The dual Tx/Rx means that the UE has one Tx/Rx pair for operation with each network node. Dual Tx/Rx means that there will potentially be separate power amplifiers for separate links, thus no strict synchronization requirement is needed. This is Case (2) in FIG. 1. FIG. 1 is a schematic diagram illustrating the Maximum Receive Timing Difference (MRTD) ($\Delta t$) at the UE. If the requirements are defined for the unsynchronized DC case, then the UE can also operate and meet requirements for the synchronized DC case. However, Case (1) in FIG. 1, which illustrates the synchronized DC case, means defining a certain synchronization accuracy between the MeNB and the SeNB applicable only for Case (2).

The receive timing difference ($\Delta t$) of radio signals from the MeNB and the SeNB may also incorporate additional delay introduced by the multipaths on individual links due to the characteristics of the radio environment. For example, in a typical urban environment, the delay spread of multiple paths received at the UE may typically be in the order of 1-3 µs. However, in wide areas like those in suburban or rural deployment scenarios, the channel delay spread due to the multipath effect of the signals observed at the UE is relatively higher, e.g. more than 1-3 µs.

In general, network-wide synchronization is not needed for DC since DC is a UE specific operation. A certain UE is connected to two eNBs in DC operation and, therefore, the synchronization requirement (whether it be a tight synchronization requirement for synchronized DC operation or a loose synchronization requirement for unsynchronized DC operation) is needed between only two eNBs (i.e., the involved MeNB and SeNB) when they serve the UE for synchronized DC operation. It should also be noted that the same MeNB and SeNB may also be serving UEs not in DC. Thus, no synchronization requirements are specified even between the MeNB and the SeNB. However, to ensure that the UE operating in DC operation is able to receive signals from the MeNB and the SeNB within the maximum allowed received timing difference ($\Delta t$), the UE needs to meet the requirements (e.g., measurement requirements, measurement accuracy requirements, Radio Link Monitoring (RLM) requirements, UE performance requirements, UE demodulation and Channel State Information (CSI) requirements, etc.):

(1) The received time difference at the UE from the MeNB and the SeNB is within the allowed limit; and
(2) The maximum transmit time difference between the MeNB and the SeNB is within a certain time limit.

LTE has a number of power saving mechanisms, some of which are mentioned below:

(1) Discontinuous Reception (DRX);
(2) Discontinuous Transmission (DTX): the DRX equivalent at the UE transmitter;
(3) Both DRX and DTX reduce transceiver duty cycle while in Radio Resource Control (RRC) connected state; and
(4) DRX also applies to the RRC_IDLE state with a typically longer cycle time than RRC connected state.

The usage of DRX is shown in FIG. 2, which illustrates a DRX cycle. As seen from FIG. 2, a UE monitors the Physical Downlink Control Channel (PDCCH) during the DRX ON duration of the DRX cycle. While in DRX mode (i.e., while the UE is in the DRX OFF state), the UE remains in power saving mode.

With respect to DRX, RRC sets the DRX cycle where the UE is operational for a certain period of time when all the scheduling and paging information is transmitted. This period of time is referred to as the DRX ON duration. During the DRX ON duration, the UE is referred to herein as being in the DRX ON state, or simply the ON state. During another period of time in the DRX cycle, the eNB knows that the UE is completely turned off and is not able to receive anything. This period of time is referred to as the DRX time or DRX OFF duration. Further, during the DRX time, the UE is referred to herein as being in the DRX OFF state, or simply the OFF state. Except when in DRX, the UE radio must be active to monitor PDCCH (e.g., to identify downlink data). During DRX, the UE radio can be turned off, and the eNB will not schedule the UE as it knows that the UE radio is not active. The DRX ON duration is defined by an onDurationTimer and, as such, the DRX ON duration is sometimes referred to herein as onDurationTimer. The onDurationTimer specifies the number of consecutive PDCCH subframe(s) at the beginning of a DRX cycle during which the UE is to be in the ON state in order to monitor for a PDCCH transmission.

The DRX/DTX functionality is an effective way to reduce the UE's battery power usage, but at the same time introduces further constraints in the scheduler's tasks. The immediate consequence of DRX/DTX is an average increase of packet delivery delays. Short DRX/DTX represents a further attempt to exploit the inactivity periods of the UE to save even more power. This further saving could be remarkable with certain types of traffic, but can also be very limited with others, like Voice over Internet Protocol (VoIP).

As mentioned earlier, DRX is configured by RRC mechanisms. DRX may have long or short DRX (i.e., DRX OFF) durations. The transition between long DRX and short DRX is determined by the eNB (Medium Access Control (MAC) commands) or by the UE based on an activity timer.

The application of long or short DRX largely depends on the application. A lower duty cycle could be used during a pause in speaking during a VoIP call. When speaking resumes, this results in lower latency. The proposed mechanism to avoid interruptions is applicable to either short or long DRX.

Similarly, for more non-real time services, e.g. data communication, for packets arriving at a lower rate than voice services, the UE can be off for a longer period of time. For packets arriving more often, the DRX interval (i.e., the DRX OFF duration) is reduced during this period.

Typically, all UEs are in DRX and the DRX ON duration can be as small as 1 ms. There is common DRX cycle for the PCell and the SCell(s) in CA. That means both PCell and SCell reception times will occur within the DRX ON duration. Alternatively, the network has to adapt the DRX ON duration.

When UE is configured with DRX, the UE performs intra-frequency, inter-frequency, and inter-Radio Access Technology (RAT) measurements according to the DRX cycle, e.g. typically once per DRX cycle especially for a DRX cycle of 40 ms or longer. Therefore, the measurement time is a function of DRX cycle length, i.e. scales with the DRX cycle length of configured DRX cycle.

Interruptions may occur at the UE to any carrier when one or two other carriers are configured, de-configured, activated, or deactivated. There can be many types of interruptions, which are listed below:

Interruptions at SCell addition/release for intra-band CA;
Interruptions at SCell addition/release for inter-band CA;
Interruptions at SCell activation/deactivation for intra-band CA;
Interruptions at SCell activation/deactivation for inter-band CA;
Interruptions during measurements on the Secondary CC (SCC) for intra-band CA;
Interruptions during measurements on the SCC for inter-band CA;
Interruptions at SCell addition/release with multiple downlink SCells;
Interruptions at SCell activation/deactivation with multiple downlink SCells;
Interruptions during measurements on the SCC with multiple downlink SCells; and
Interruptions at overlapping addition/release/activation/deactivation of SCells.

In addition to these interruptions as experienced in legacy CA systems, interruptions may be required for many different reasons in a UE supporting DC. For example, the interruptions may include:

Interruptions on the PCell or SCells due to configuration of pSCell or another SCell or vice versa;
Interruptions on PSCell or SCells due to configuration of measurement gap length in MCG; and
Interruption on any carrier due to DRX ON duration of another carrier.

Systems and methods for avoiding or reducing the number of interruptions at a UE operating in a DC mode of operation are desired.

SUMMARY

Systems and methods relating to avoiding, or at least mitigating, interruptions at a wireless device during multi-connectivity (e.g., Dual Connectivity (DC)) operation of the wireless device in Discontinuous Reception (DRX) are disclosed. In some embodiments, a method of multi-connectivity operation of a wireless device in DRX comprises determining whether a first DRX ON duration in a first DRX cycle configured for use by the wireless device in a first cell group for multi-connectivity operation and a second DRX ON duration in a second DRX cycle configured for use by the wireless device in a second cell group for multi-connectivity operation partially overlap in time with one another. The method further comprises, upon determining that the first DRX ON duration and the second DRX ON duration partially overlap in time with one another, taking one or more actions that mitigate the partial overlap between the first DRX ON duration in the first DRX cycle configured for use by the wireless device in the first cell group and the second ON duration in the second DRX cycle configured for use by the wireless device. By mitigating (e.g., partly or fully avoiding) the partial overlap between the DRX ON durations of the first and second DRX cycles, interruptions at the wireless device as a result of transitioning between DRX states in one cell group during a DRX ON duration of the other cell group can be avoided.

In some embodiments, taking the one or more actions comprises taking the one or more actions such that a transition between a DRX ON state and a DRX OFF state with respect to the first DRX ON duration is avoided during the second DRX ON duration. In other embodiments, taking the one or more actions comprises taking the one or more actions such that a transition between a DRX ON state and a DRX OFF state with respect to the second DRX ON duration is avoided during the first DRX ON duration. In other embodiments, taking the one or more actions comprises taking the one or more actions such that a transition between a DRX ON state and a DRX OFF state with respect to the first DRX ON duration is avoided during the second DRX ON duration and a transition between the DRX ON state and the DRX OFF state with respect to the second DRX ON duration is avoided during the first DRX ON duration.

In some embodiments, determining whether the first DRX ON duration and the second DRX ON duration partially overlap in time with one another comprises determining whether the first DRX ON duration and the second DRX ON duration partially overlap in time with one another based on a comparison of one or more DRX parameters for the first DRX cycle and the second DRX cycle, the one or more DRX parameters comprising at least one of: DRX duration and DRX cycle length.

In some embodiments, determining whether the first DRX ON duration and the second DRX ON duration partially overlap in time with one another comprises determining whether the first DRX ON duration and the second DRX ON duration partially overlap in time with one another based on a comparison of a system frame number and one or more subframe numbers within a frame in which the first DRX ON duration will be implemented and a system frame number and one or more subframe numbers within a frame in which the second DRX ON duration will be implemented.

In some embodiments, determining whether the first DRX ON duration and the second DRX ON duration partially overlap in time with one another comprises determining whether the first DRX ON duration and the second DRX ON duration partially overlap in time with one another taking into consideration whether the first cell group and the second cell group are synchronized or unsynchronized with respect to the received time difference of signals between subframe boundaries of the first cell group and the second cell group at the wireless device in multi-connectivity operation.

In some embodiments, taking the one or more actions comprises adapting one or more time instances at which a DRX state transitions between a DRX ON state and a DRX OFF state for at least one of the first DRX ON duration of the first DRX cycle and the second DRX ON duration of the second DRX cycle such that: (a) one or more transitions between the DRX ON state and the DRX OFF state with respect to the first DRX ON duration in the first DRX cycle are avoided during the second DRX ON duration in the second DRX cycle and/or (b) one or more transitions between the DRX ON state and the DRX OFF state with respect to the second DRX ON duration in the second DRX cycle are avoided during the first DRX ON duration in the first DRX cycle. Taking the one or more actions further comprises changing between the DRX ON state and the DRX OFF state in the at least one of the first DRX cycle and the second DRX cycle at the one or more time instances.

In some embodiments, taking the one or more actions further comprises informing at least one of a first network node serving the first cell group and a second network node serving the second cell group about the one or more time instance(s) adapted by the wireless device.

In some embodiments, adapting the one or more time instances comprises adapting a time instance for activation of the second DRX ON duration in the second DRX cycle such that a start of the second DRX ON duration in the second DRX cycle is time-aligned with a start of the first DRX ON duration in the first DRX cycle.

In some embodiments, adapting the one or more time instances further comprises adapting a time instance for deactivation of the first DRX ON duration in the first DRX cycle such that an end of the first DRX ON duration in the first DRX cycle is time-aligned with an end of the second DRX ON duration in the second DRX cycle.

In some embodiments, adapting the one or more time instances comprises adapting the one or more time instances such that: (a) start times of the first DRX ON duration and the second DRX ON duration are time-aligned and/or (b) end times of the first DRX ON duration and the second DRX ON duration are time-aligned.

In some embodiments, taking the one or more actions comprises deciding to use only non-successive DRX ON durations in at least one of the first cell group and the second cell group such that partially overlapping DRX ON durations between the first and second DRX cycle of the first and second cell groups are avoided. Taking the one or more actions further comprises changing between DRX states in at least one of the first DRX cycle and the second DRX cycle according to the decided use of only non-successive DRX ON durations in the at least one of the first cell group and the second cell group.

In some embodiments, taking the one or more actions further comprises informing at least one of a first network node serving the first cell group and a second network node serving the second cell group about the one or more time instance(s) adapted by the wireless device.

In some embodiments, the multi-connectivity operation is DC operation.

In some embodiments, the first cell group and the second cell group are non-synchronized with respect to the received time difference of signals between subframe boundaries of the first cell group and the second cell group at the wireless device in multi-connectivity operation.

In some embodiments, the first cell group and the second cell group are synchronized with respect to the received time difference of signals between subframe boundaries of the first cell group and the second cell group at the wireless device in multi-connectivity operation.

Embodiments of a wireless device are also disclosed.

In some embodiments, a method of multi-connectivity operation of a network node for a wireless device in DRX comprises adapting one or more parameters of a first DRX cycle configured for use by a wireless device in a first cell group for multi-connectivity operation such that a partial overlap between a first DRX ON duration in the first DRX cycle and a second DRX ON duration in a second DRX cycle configured for use by the wireless device in a second cell group for multi-connectivity operation is avoided. The method further comprises configuring the wireless device with the one or more parameters for the first DRX cycle.

In some embodiments, adapting the one or more parameters of the first DRX cycle configured for use by the wireless device in the first cell group comprises adapting the one or more parameters of the first DRX cycle configured for use by the wireless device in the first cell group in a coordinated manner with adaptation, by a second network node, of one or more parameters of a second DRX cycle configured for use by the wireless device in a second cell group for multi-connectivity operation.

In some embodiments, adapting the one or more parameters of the first DRX cycle configured for use by the wireless device in the first cell group comprises adapting the one or more parameters of the first DRX cycle configured for use by the wireless device in the first cell group such that DRX ON durations in the first DRX cycle are fully time-aligned with DRX ON durations in the second DRX cycle.

In some embodiments, a periodicity of the first DRX cycle is greater than the periodicity of the second DRX cycle, and adapting the one or more parameters of the first DRX cycle configured for use by the wireless device in the first cell group comprises adapting the one or more parameters of the first DRX cycle configured for use by the wireless device in the first cell group such that DRX ON durations of the first DRX cycle are fully time-aligned with a subset of the DRX ON durations of the second DRX cycle.

In some embodiments, adapting the one or more parameters of the first DRX cycle configured for use by the wireless device in the first cell group comprises adapting the one or more parameters of the first DRX cycle configured for use by the wireless device in the first cell group such that DRX ON durations in the first DRX cycle are fully non-overlapping, in time, with DRX ON durations in the second DRX cycle.

In some embodiments, the multi-connectivity operation is DC operation.

In some embodiments, the first cell group and the second cell group are non-synchronized cell groups with respect to the received time difference of signals between subframe boundaries of the first cell group and the second cell group at the wireless device in multi-connectivity operation.

In some embodiments, the first cell group and the second cell group are synchronized with respect to the received time difference of signals between subframe boundaries of the first cell group and the second cell group at the wireless device in multi-connectivity operation.

Embodiments of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
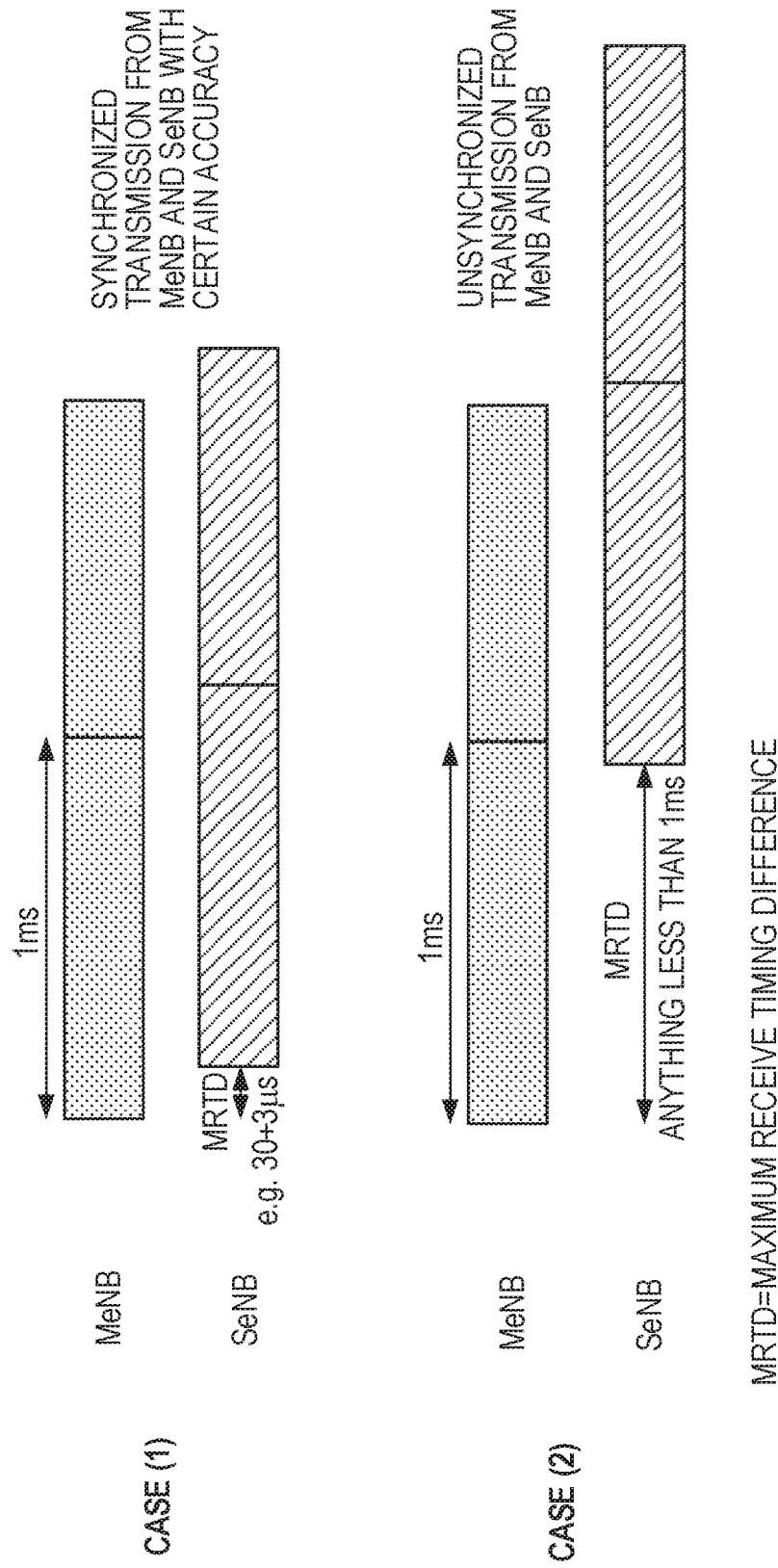
FIG. 1 is a schematic diagram illustrating the Maximum Receive Timing Difference (MRTD) (Δt) at a User Equipment (UE)
Figure 2:
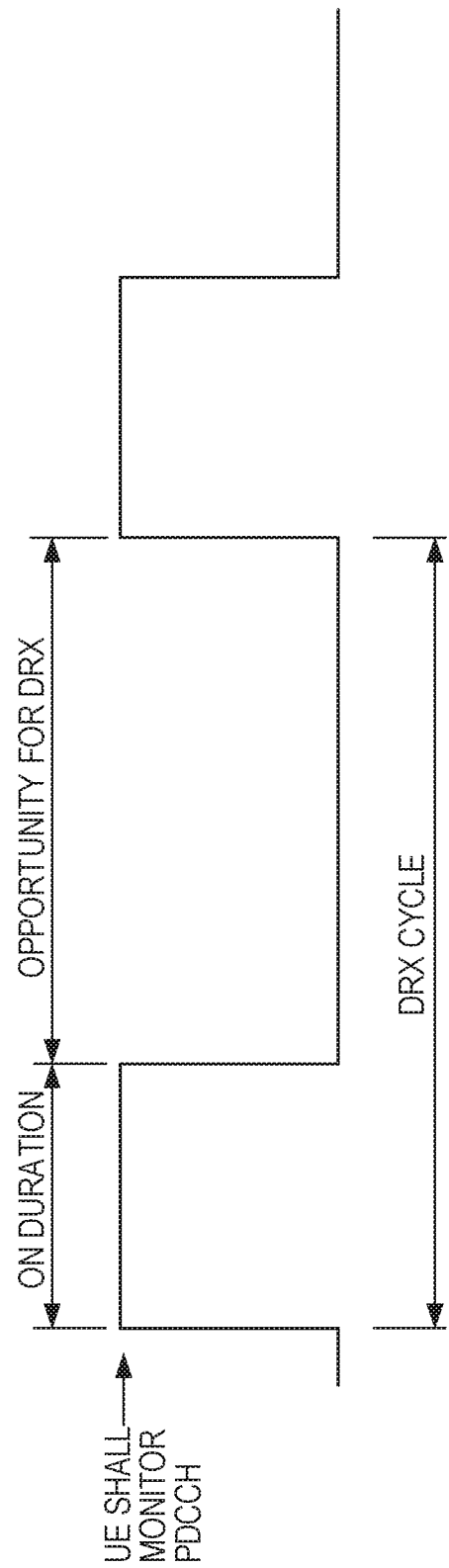
FIG. 2 illustrates a Discontinuous Reception (DRX) cycle.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In some embodiments, the non-limiting term User Equipment (UE) is used. As used herein, a UE can be any type of wireless device capable of communicating with a network node and/or another UE over radio signals in a cellular or mobile communications network/system. The UE may also be a radio communication device, a target device, a Device to Device (D2D) UE, a machine type UE or a UE capable of Machine to Machine (M2M) communication, a sensor equipped with a UE, a Personal Digital Assistant (PDA), an iPad, a tablet, a mobile terminal, a smart phone, Laptop Embedded Equipment (LEE), Laptop Mounted Equipment (LME), a Universal Serial Bus (USB) dongle, a Customer Premises Equipment (CPE), etc.

Also, in some embodiments, the generic terminology "radio network node" or simply "network node" is used. It can be any kind of network node that communicates with a UE (or more generally a wireless device) and/or another network node. Examples of a network node include a base station, a radio base station, a base transceiver station, a base station controller, a network controller, an enhanced or evolved Node B (eNB), a Node B, a relay node, an access point, a radio access point, a Remote Radio Unit (RRU) Remote Radio Head (RRH), a Multi-Standard Radio (MSR) radio node such as a MSR base station, a network controller, a Radio Network Controller (RNC), a Base Station Controller (BSC), a donor node controlling relay, a Base Transceiver Station (BTS), transmission points, transmission nodes, nodes in a Distributed Antenna System (DAS), a core network node (e.g., a Mobile Switching Centre (MSC), a Mobility Management Entity (MME), etc.), Operation and Maintenance (O&M), Operations Support System (OSS), Self-Organizing Network (SON), positioning node (e.g., Evolved Serving Mobile Location Centre (E-SMLC)), Minimization of Drive Tests (MDT), a Master eNB (MeNB), a Secondary eNB (SeNB), a booster, an anchor, etc.

In some embodiments, the terms "first node" and "second node" are used, where the first node can be a network node and the second node can be a UE. The first node and the second node may also be interchangeably referred to as a first radio node and a second radio node, respectively. In some embodiments, cell change of the second node (e.g., UE) is done by the first node or by the second node itself. In some embodiments, only the term node may be used, which can be a first or a second node, e.g. in case both the first and the second node can perform the same task.

In some embodiments, the term "determining" is used and it may also be obtaining, receiving, detecting, identifying, etc., information or a parameter etc.

The embodiments are described by considering Third Generation Partnership Project (3GPP) Long Term Evolution (LTE). However, the embodiments are applicable to any Radio Access Technology (RAT) or multi-RAT systems, where the UE receives and/or transmit signals (e.g., data), e.g. LTE Frequency Division Duplexing (FDD)/Time Division Duplexing (TDD), Wideband Code Division Multiple Access (WCDMA)/High Speed Packet Access (HSPA), Global System for Mobile Communications (GSM)/GSM Enhanced Data Rates for GSM Evolution (EDGE) Radio Access Network (RAN) (GERAN), Wi-Fi, Wireless Local Area Network (WLAN), Code Division Multiple Access 2000 (CDMA2000), etc.

The embodiments described herein can be applied to any of the Dual Connectivity (DC) cases. In another words, regardless of number of Component Carriers (CCs) in downlink or uplink, the embodiments directly apply.

Systems and methods are disclosed herein that relate to avoiding interruptions at a UE operating in a DC mode of operation that may be caused by transitions between a Discontinuous Reception (DRX) ON state and a DRX OFF state for one cell group during a DRX ON duration of another cell group. Before describing embodiments of the present disclosure, a brief discussion of DC and interruptions at the UE that may be caused due to DC operation is beneficial.

In DC, each Cell Group (CG) independently configures the UE with a DRX cycle for serving cells of the UE belonging to that CG. For example, the Master CG (MCG) and the Secondary CG (SCG) independently configure the UE with the DRX cycles for serving cells of the UE in the MCG and the SCG, respectively. This means that one or more associated DRX parameters such as DRX cycle length, DRX ON duration, inactivity timer, etc. for the MCG and the SCG may or may not be the same and may not have any relation. The independent configuration of the DRX cycles in each CG leads to certain problems as described below with examples.

Figure 3:
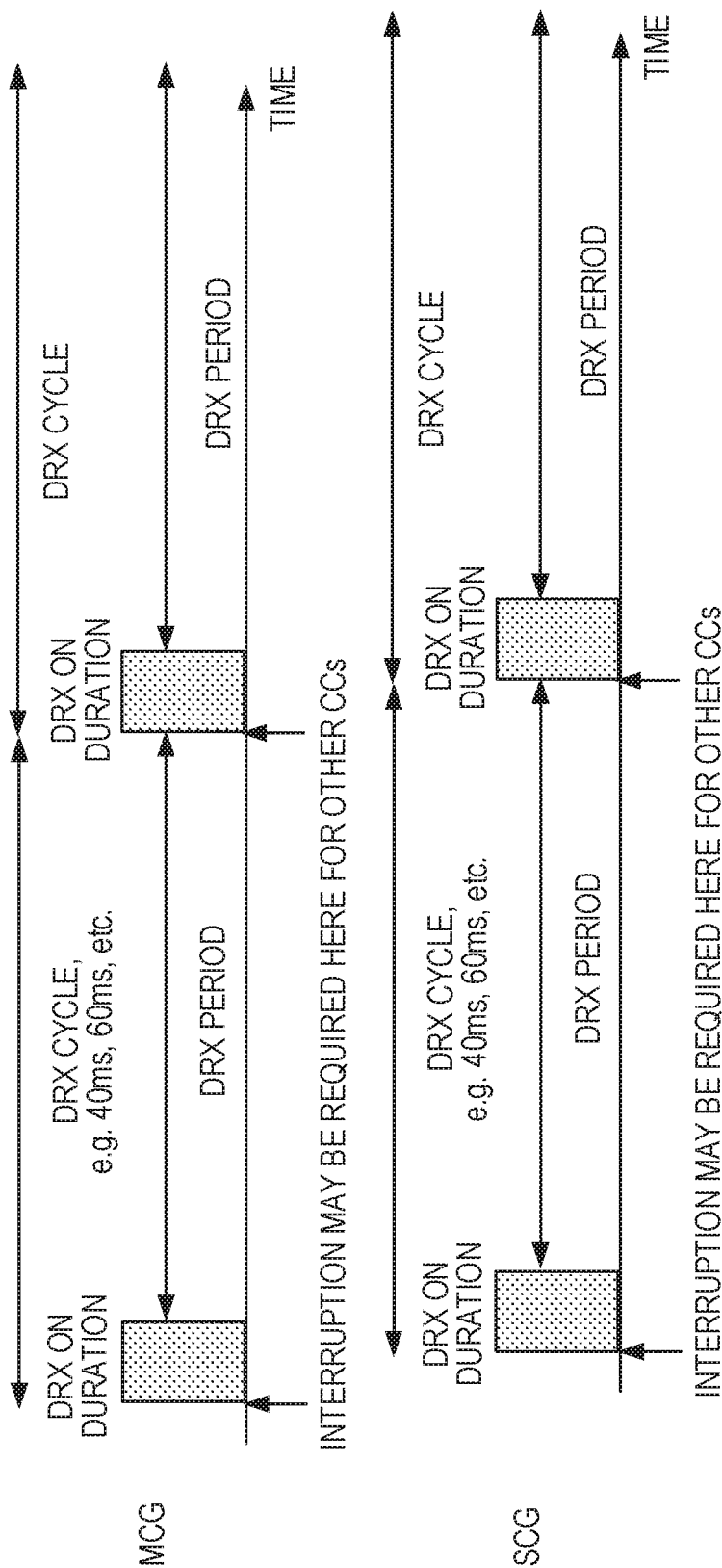
FIG. 3 illustrates one example in which a DRX ON duration of a Master Cell Group (MCG) for Dual Connectivity (DC) operation of a UE and a DRX ON duration of a Secondary Cell Group (SCG) for DC operation of the UE partially overlap.

In an example shown in FIG. 3, the DRX ON durations of the MCG DRX cycle and the SCG DRX cycle partially overlap with each other. In this example, it is assumed that the MCG and SCG DRX cycles have the same DRX cycle periodicity as well as the same DRX ON durations. However, the DRX cycles are shifted in time causing partial overlap between their DRX ON durations. In this example, the UE will cause interruption during both DRX ON durations due to partial overlap as follows:

Interruption in the DRX ON duration in the MCG due to change in the DRX state from DRX OFF to DRX ON in the SCG; and Interruption in DRX ON duration in the SCG due to change in the DRX state from DRX ON to DRX OFF in the MCG.

These interruptions will cause DRX ON duration in the MCG and the SCG not to perform properly. For example, due to the interruption on the MCG, the UE will miss the reception of Physical Downlink Control Channel (PDCCH) in the MCG. The missed reception of PDCCH in the MCG will result in, e.g., missed detection of downlink allocations for the UE. This means that the interruption will introduce further delay in terms of downlink latency. If the DRX periodicity (i.e., the periodicity of the DRX cycle) is same for the MCG and the SCG but their DRX ON durations are partially shifted, then the UE will always miss PDCCH detection in one or more initial subframes of the CG with the leading DRX ON duration, i.e. whose DRX ON duration starts before the DRX ON duration of the other CG. Similarly, the UE will always miss PDCCH detection in one more trailing subframes of the CG with the trailing DRX ON duration, i.e. whose DRX ON duration starts after the DRX ON duration of the other CG.

The loss in PDCCH reception is not desired as this will severely degrade the MCG as well as the SCG performance in terms of downlink latency. It is especially undesirable in a DRX scenario, as the scheduling opportunities for both the MCG and the SCG are already limited without further loss due to interruptions.

Figure 4:
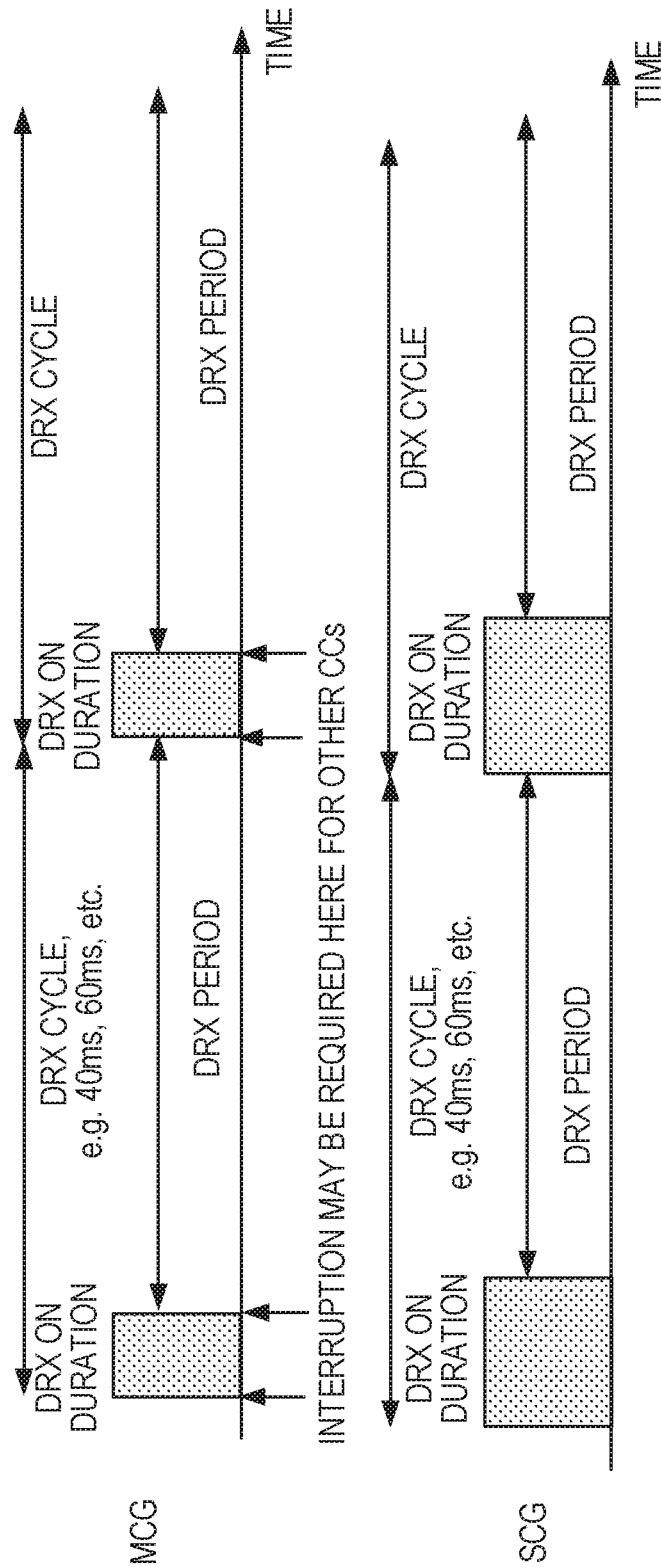
FIG. 4 illustrates another example in which a DRX ON duration of a MCG for DC operation of a UE and a DRX ON duration of a SCG for DC operation of the UE partially overlap.

In another example, the MCG and SCG DRX cycles may have the same periodicity and may have aligned DRX ON durations, but the length of DRX ON durations for the MCG and the SCG may be different (e.g., DRX ON=5 ms for the MCG and DRX ON=10 ms for the SCG). This arrangement of partial overlap of SCG DRX ON duration is shown in FIG. 4. In this example, the DRX ON duration of the MCG DRX cycle overlaps with the central part (e.g., the central 5 ms) of the DRX ON duration of the SCG DRX cycle. Therefore, in this example, the change in DRX state (from DRX ON to DRX OFF and vice versa) of the MCG DRX cycle will cause interruption twice during the DRX ON duration of the SCG DRX cycle. However, changes in the DRX state of the SCG DRX cycle do not cause any interruptions during the DRX ON duration of the MCG DRX cycle.

FIGS. 3 and 4 are provided as examples. However, many other examples of partially overlapping DRX ON durations can be envisaged. For instance, another example would be where the DRX cycle on one CG is an integer multiple of the other CG and with an offset in starting time. Since the DRX configurations for the MCG and the SCG are independent, the embodiments disclosed herein should be considered to be generic in dealing with cases of partially overlapping DRX.

In this disclosure, a plurality of methods in a network node and a UE operating in DC are described that facilitate the UE to avoid interruptions during a DRX ON duration of a CG due to change in the DRX state (i.e., between DRX ON and DRX OFF) in another CG. Embodiments include steps performed in a UE configured for DC operation in DRX, comprising:

Determining if a first DRX ON duration in a first DRX cycle configured for use by the UE in a first CG (e.g., MCG) and a second DRX ON duration in a second DRX cycle configured for use by the UE in a second CG (e.g., SCG) partially overlap in time with each other;

If it is determined that the first and the second DRX ON durations partially overlap with each other, then adapting a time instance(s) of at least one of the first DRX ON duration and the second DRX ON duration for enabling the UE to avoid interruption of signals transmitted between the UE and the serving cell(s) of at least one of the first and the second CGs, which interruption may occur when changing DRX states between DRX ON and DRX OFF;

Changing between DRX states of at least one of the first DRX cycle and the second DRX cycle at the adapted time instance(s); and (Optionally) Informing at least one of a first network node and a second network node about the adapted time instance(s) for changing between the DRX states.

Embodiments of methods in a network node and a UE operating in DC are disclosed enabling the UE to avoid interruptions in DRX ON duration of a CG due to change in the DRX states (i.e., between DRX ON and DRX OFF) in another CG. These embodiments include steps performed in a first and/or a second network node serving a UE configured for DC operation in DRX, comprising:

Adapting one or more parameters of a first DRX cycle configured for use by the UE in a first CG (e.g., MCG) and one or more parameters in a second DRX cycle configured for use by the UE in a second CG (e.g., SCG), which adaptation enables at least a first DRX ON duration of the first DRX cycle and at least a second DRX ON duration of the second DRX cycle to either fully overlap with each other in time or don't overlap at all with each other in time; and Configuring the UE with the adapted one or more parameters of the first DRX cycle and of the second DRX cycle.

Some non-limiting advantages of embodiments of the present disclosure are readily apparent to those of skill in the art, and include:

The interruption of signals in serving cells in one or more CGs are avoided when the UE is configured with DRX cycles in DC operation;

The UE is able to receive downlink control channels, e.g. PDCCH, during the DRX ON duration;

The data reception and transmission in DRX are not lost or delayed; and

The network nodes (e.g., MeNB and SeNB) are able to assign the resources more efficiently since scheduling grants sent to the UE are not lost due to avoidance of the interruptions.

A UE-based solution leads to UE receivers for the MCG and/or the SCG being on for a longer duration than they would otherwise be used for if interruptions were allowed at any time, which leads to increased UE power consumption. However, if the network node adapts the parameters of the first or second DRX cycle, power consumption increase can be reduced.

Figure 5:
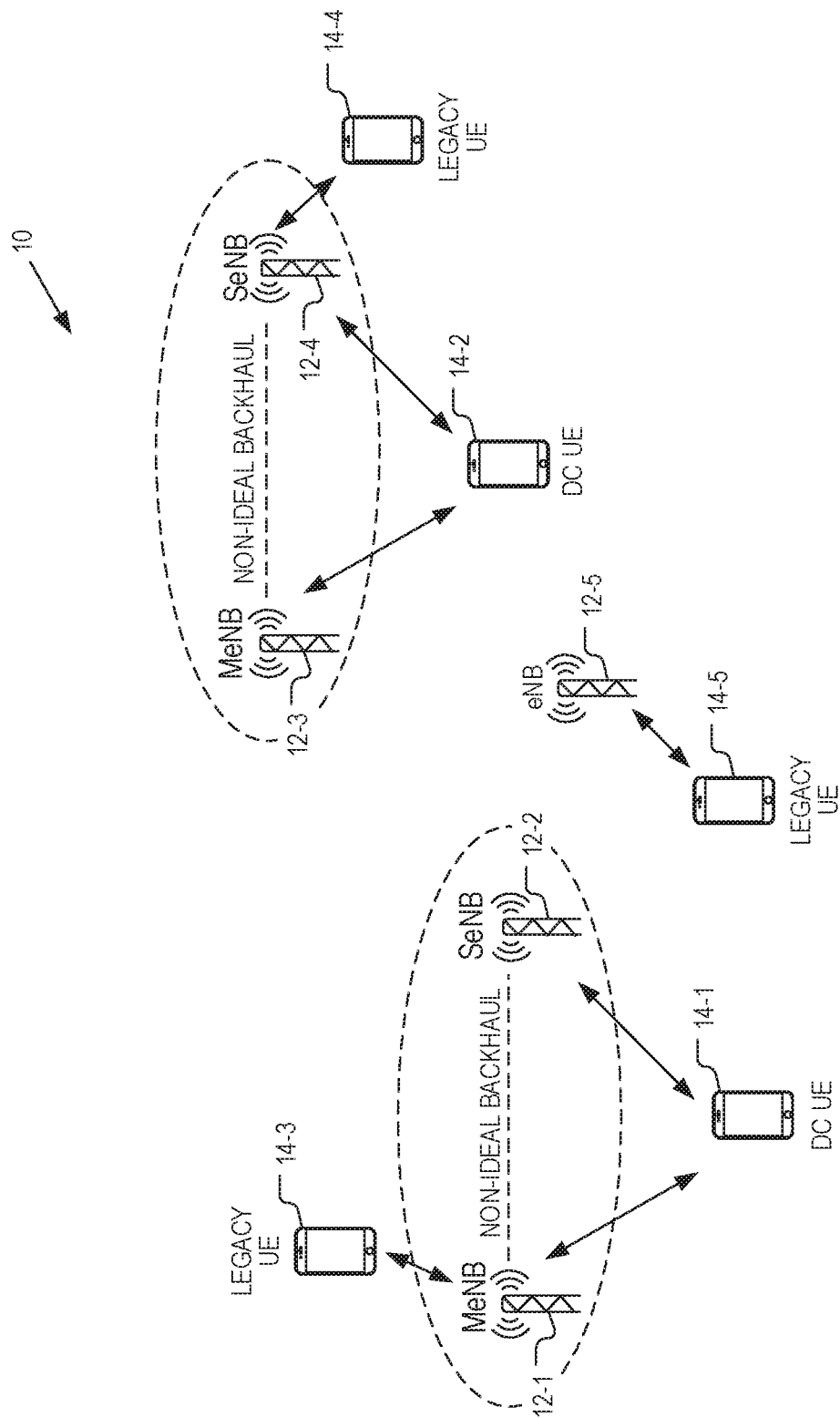
FIG. 5 illustrates one example of a cellular communications network enabling DC operation with avoidance of interruptions during DRX ON durations in one Cell Group (CG) as a result of DRX state changes in another CG according to some embodiments of the present disclosure.

One example of a cellular communications network 10 enabling DC operation with avoidance of interruptions during DRX ON durations in one CG as a result of DRX state changes in another CG is illustrated in FIG. 5. Note that while DC is specifically described herein, the concepts described herein are equally applicable to multi-connectivity operation in general (i.e., operation with connections to two or more CGs). One example of multi-connectivity operation is DC operation. Also, multi-connectivity (e.g., DC) is a wireless device (e.g., UE) specific feature, and a network node may support both wireless devices that support multi-connectivity operation and wireless devices that do not support multi-connectivity operation (e.g., legacy wireless devices).

As illustrated in FIG. 5, the cellular communications network 10 includes a number of eNBs 12-1 through 12-5, which are generally referred to herein as eNBs 12. The eNBs 12 provide radio access to a number of UEs 14-1 through 14-5, which are generally referred to herein as UEs 14. In this example, the UE 14-1 operates according to a DC scheme in which the eNB 12-1 is a MeNB of the UE 14-1 and the eNB 12-2 is a SeNB of the UE 14-1 for DC operation. As such, the eNB 12-1 is also referred to herein as the MeNB 12-1 of the UE 14-1, the eNB 12-2 is also referred to herein as the SeNB 12-2 of the UE 14-1, and the UE 14-1 is also referred to herein as a DC UE 14-1. The MeNB 12-1 provides a MCG including a Primary Cell (PCell) and, in some embodiments, one or more Secondary Cells (SCells) for the UE 14-1. Similarly, the SeNB 12-2 provides a SCG including a Primary SCell (pSCell) and, in some embodiments, one or more SCells for the UE 14-1. The cells in the MCG and the SCG of the UE 14-1 are all referred to herein as serving cells of the UE 14-1. The MeNB 12-1 and the SeNB 12-2 are connected via a non-ideal backhaul connection (e.g., an X2 connection).

In a similar manner, in this example, the UE 14-2 operates according to a DC scheme in which the eNB 12-3 is a MeNB of the UE 14-2 and the eNB 12-4 is a SeNB of the UE 14-2 for DC operation. As such, the eNB 12-3 is also referred to herein as the MeNB 12-3 of the UE 14-2, the eNB 12-4 is also referred to herein as the SeNB 12-4 of the UE 14-2, and the UE 14-2 is also referred to herein as a DC UE 14-2. The MeNB 12-3 provides a MCG including a PCell and, in some embodiments, one or more SCells for the UE 14-2. Similarly, the SeNB 12-4 provides a SCG including a pSCell and, in some embodiments, one or more SCells for the UE 14-2. The cells in the MCG and the SCG of the UE 14-2 are all referred to herein as serving cells of the UE 14-2. The MeNB 12-3 and the SeNB 12-4 are connected via a non-ideal backhaul connection (e.g., an X2 connection).

Notably, the operation of the eNBs 12-1 and 12-2 as the MeNB 12-1 and the SeNB 12-2 of the UE 14-1 is specific to the UE 14-1. As such, the eNB 12-1 may also serve as an eNB for a UE 14-3 that is not operating in a DC mode. In a similar manner, the eNB 12-2 may also serve as an eNB for a UE 14-4 that is not operating in a DC mode. The UEs 14-3 and 14-4 may be, for example, legacy UEs that do not support DC operation. Also, the cellular communications network 10 may also include one or more eNBs, such as the eNB 12-5, that provide radio access to UEs, such as the UE 14-5, that are not operating in DC mode or that do not support DC operation. In fact, the eNB 12-5 may not support DC operation.

Figure 6:
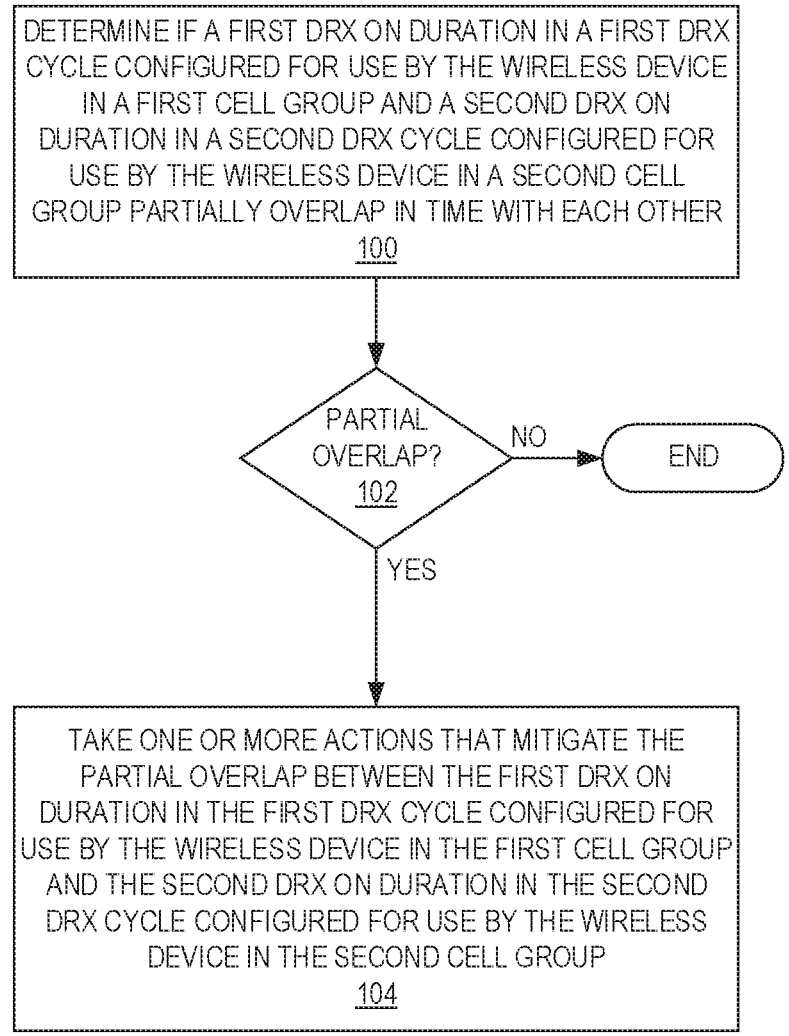
FIG. 6 is a flow chart that illustrates the operation of a wireless device (e.g., a UE) to avoid interruptions during DC operation according to some embodiments of the present disclosure.

FIG. 6 is a flow chart that illustrates the operation of a wireless device (e.g., the UE 14-1 or the UE 14-2) to avoid interruptions during DC operation according to some embodiments of the present disclosure. As illustrated, the wireless device determines if a first DRX ON duration in a first DRX cycle configured for use by the wireless device in a first CG (e.g., the MCG) and a second DRX ON duration in a second DRX cycle configured for use by the wireless device in a second CG (e.g., the SCG) partially overlap in time with each other (step 100). If there is no partial overlap between the DRX ON durations in the first and second DRX cycles (step 102, NO), the process ends. Conversely, if there is a partial overlap between the DRX ON durations in the first and second DRX cycles (step 102, YES), the wireless device takes one or more actions that mitigate (e.g., partly or fully avoid) the partial overlap between the first DRX ON duration in the first DRX cycle configured for use by the wireless device in the first CG (e.g., the MCG) and the second DRX ON duration in the second DRX cycle configured for use by the wireless device in the second CG (e.g., the SCG) (step 104).

As described below in detail, in some embodiments, the one or more actions taken by the wireless device to mitigate the partial overlap include adapting one or more time instances (e.g., starting time instance and/or ending time instance) of the first DRX ON duration and/or one or more time instances (e.g., starting time instance and/or ending time instance) of the second DRX ON duration such that the start of the first DRX ON duration is time-aligned with the start of the second DRX ON duration and/or the end of the first DRX ON duration is time-aligned with the end of the second DRX ON duration. If both the start and end times of the DRX ON durations are time-aligned, then the DRX ON durations are fully aligned. However, even if only the start time or only the end times of the DRX ON durations are time-aligned, interruptions at the wireless device are still mitigated (i.e., interruptions are partly avoided). In some other embodiments, the one or more actions taken by the wireless device to mitigate the partial overlap include using only non-successive DRX ON durations in the first DRX cycle for the first CG and/or using only non-successive DRX ON durations in the second DRX cycle for the second CG such that partially overlapping DRX ON durations between the first and second CGs are avoided.

Figure 7:
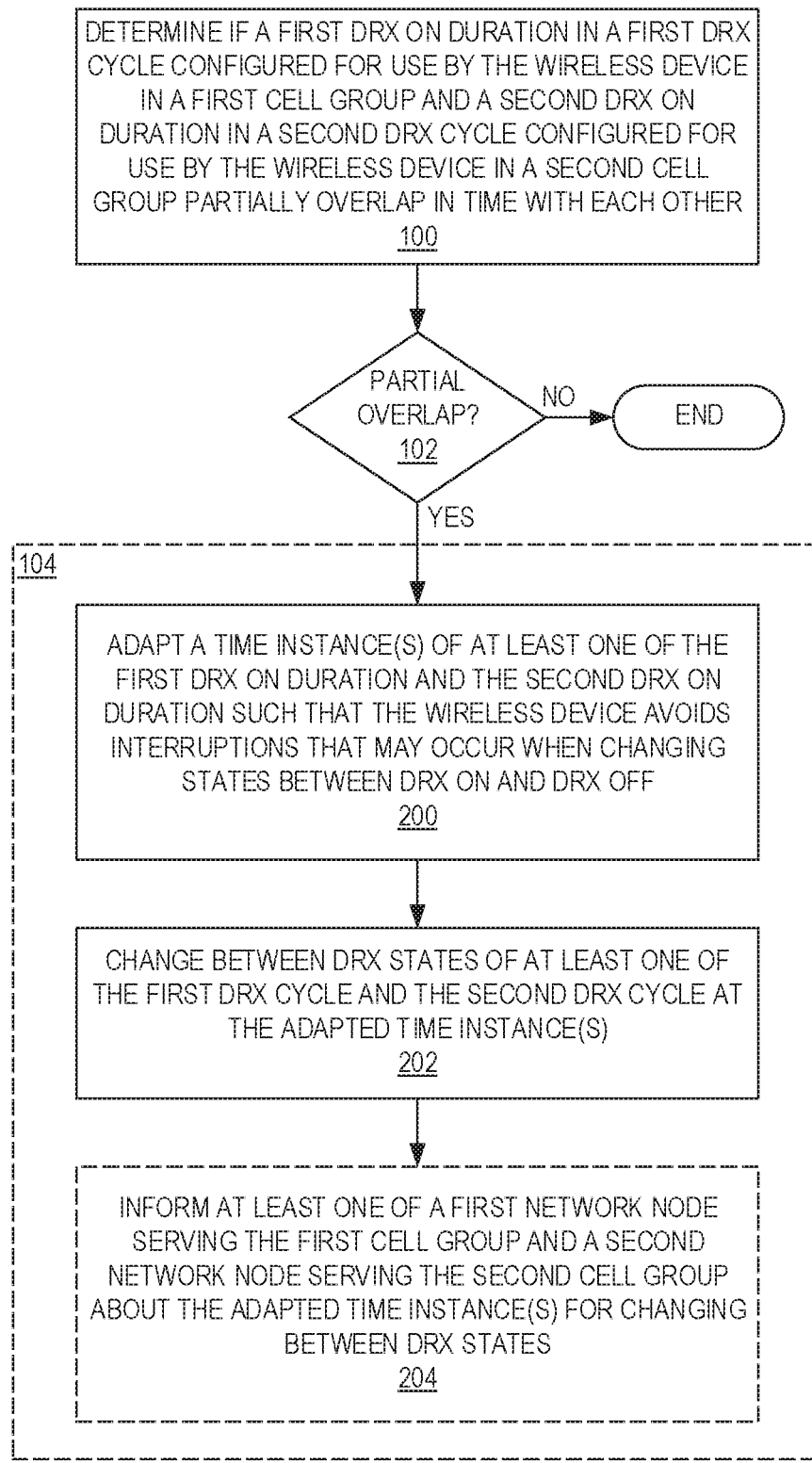
FIG. 7 is a flow chart that illustrates the process of FIG. 6 in more detail according to some embodiments of the present disclosure.

FIG. 7 is a flow chart that illustrates the process of FIG. 6 in more detail according to some embodiments of the present disclosure. In general, the process of FIG. 7 is performed by the wireless device (e.g., the UE 14-1 or the UE 14-2) to avoid interruptions due to partial overlapping of DRX ON durations of the MCG and SCG DRX cycles for DC operation. As illustrated, the wireless device determines if a first DRX ON duration in a first DRX cycle configured for use by the wireless device in a first CG (e.g., the MCG) and a second DRX ON duration in a second DRX cycle configured for use by the wireless device in a second CG (e.g., the SCG) partially overlap in time with each other (step 100).

In other words, the wireless device (e.g., the UE 14-1 or 14-2) determines if there is any overlap in time between the DRX ON durations of the MCG DRX cycle (i.e., the DRX cycle configured at the wireless device for serving cells in the MCG) and the DRX ON durations of the SCG DRX cycle (i.e., the DRX cycle configured at the wireless device for serving cells in the SCG). In this context, overlap in time means that starting or stopping the receiver of the wireless device for one CG would cause interruption to downlink control channel (e.g., PDCCH for LTE) reception required on the other CG.

If there is no partial overlap between the DRX ON durations in the first and second DRX cycles (step 102, NO), the process ends. Conversely, if there is a partial overlap between the DRX ON durations in the first and second DRX cycles (step 102, YES), the wireless device takes one or more actions that mitigate the partial overlap between the first DRX ON duration in the first DRX cycle configured for use by the wireless device in a first CG (e.g., the MCG) and the second DRX ON duration in the second DRX cycle configured for use by the wireless device in a second CG (e.g., the SCG) (step 104).

More specifically, in this example, the one or more actions include adapting a time instance(s) of at least one of the first DRX ON duration of the first DRX cycle configured for use by the wireless device in the first CG and the second DRX ON duration of the second DRX cycle configured for use by the wireless device in the second CG such that the wireless device avoids interruptions that may occur when changing DRX states between DRX ON and DRX OFF (step 200). In other words, the wireless device adapts the time instance(s) at which the DRX state (i.e., between DRX ON and OFF states) of at least one of the MCG DRX cycle and SCG DRX cycle is to be changed in order to avoid interruption in serving cells of at least one of the MCG and SCG. The wireless device changes, or switches, between DRX states of the at least one of the first and second DRX cycles at the adapted time instance(s) (step 202).

The adaption of the time instance(s) may be realized by the wireless device based on, e.g., a predefined rule, wireless device implementation, and/or a predefined rule to be applied by the wireless device only when permitted by the network node (e.g., the MeNB 12-1). The predefined rule may also be realized by specifying a predefined requirement that would prevent the wireless device from causing interruption in at least one CG regardless of whether ON durations of DRX cycles configured for use in different CGs partially overlap or not in time. For example, a requirement may be predefined that the wireless device shall not cause any interruption in the MCG and the SCG regardless of whether the ON durations of DRX cycles configured for operation in the MCG and the SCG overlap in time or not; the overlap herein can be full or partial overlap in time. In other words, the wireless device in DC operation is not allowed to cause any interruption during the ON durations of any of the MCG and SCG DRX cycles regardless of the length of the ON durations (i.e., when "onDurationTimer" is running) and regardless of their occurrence in time with respect to each other.

Optionally, in some embodiments, the one or more actions taken by the wireless device further include informing at least one of a first network node (e.g., the MeNB 12-1) serving the first CG and a second network node (e.g., the SeNB 12-2) serving the second CG about the adapted time instance(s) for changing between DRX states (step 204).

In step 100 above, the wireless device determines whether there is a partial overlap between the DRX ON durations of the first and second DRX cycles configured for use by the wireless device. While a partial overlap in the DRX ON durations of the first and second DRX cycles may be detected using any suitable technique, some examples are described below. In some embodiments, the wireless device is configured by the network nodes (e.g., the MeNB 12-1 and the SeNB 12-2) with the respective DRX cycles for use in serving cells of the corresponding CGs. For example, the UE 14-1 is configured by the MeNB 12-1 and the SeNB 12-2 with the DRX cycle for the MCG and the DRX cycle for the SCG, respectively. The wireless device can compare DRX parameters like DRX durations, DRX cycle length, etc. of the two DRX cycles to determine whether their DRX ON durations would partially overlap. More specifically, the wireless device can compare the System Frame Number (SFN) and starting subframe number or subframe numbers within a frame where the DRX ON durations for the MCG and the SCG need to be implemented and, based on this comparison, the wireless device can determine whether the DRX ON durations are overlapping to each other not. The information about frame numbers and subframe numbers can be determined based on information related to the DRX cycles received from the network nodes.

As an example, the subframes in the DRX ON duration of MCG are $\{i, \ldots, i+N-1\}$ and the subframes in the DRX ON duration of the SCG are {j, . . . , j+M−1}, where N and M are the lengths of the DRX ON durations in MCG and SCG, respectively. N and M are values in milliseconds (ms). The wireless device can compare whether subframe i and subframe j overlap each other or not. In one implementation, the wireless device, based on this step (i.e., received DRX configurations of MCG and SCG), determines whether the ON durations of the two DRX cycles partially overlap or not.

The actual overlap between the ON durations experienced or observed at the wireless device however depends on whether the DC operation is synchronized or unsynchronized. In synchronized and unsynchronized DC operations, the received time difference between subframe boundaries of the MCG and the SCG is within ±33 microseconds (μs) and ±500 μs, respectively, in some example implementations. Therefore, the wireless device may further determine the overlapping ratio of starting times of the SCG and the MCG subframes observed at the wireless device. The overlapping ratio herein means the ratio of the starting time of the subframe received from the SCG to the starting time of the subframe received from the SCG at the UE. In other words, the wireless device determines the extent to which it observes the subframe timing boundary mismatch between subframes of the MCG and the SCG. Based on this, the wireless device decides whether the DRX ON durations will overlap with each other or not when the two DRX cycles are configured by the wireless device.

Figure 8:
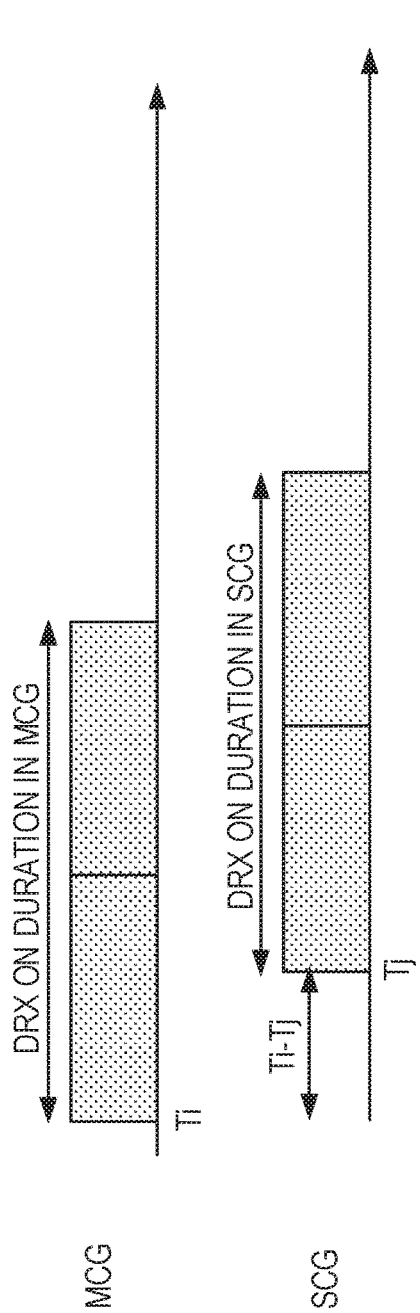
FIG. 8 illustrates determination of partial overlap of DRX ON durations according to some embodiments of the present disclosure.
Figure 9:
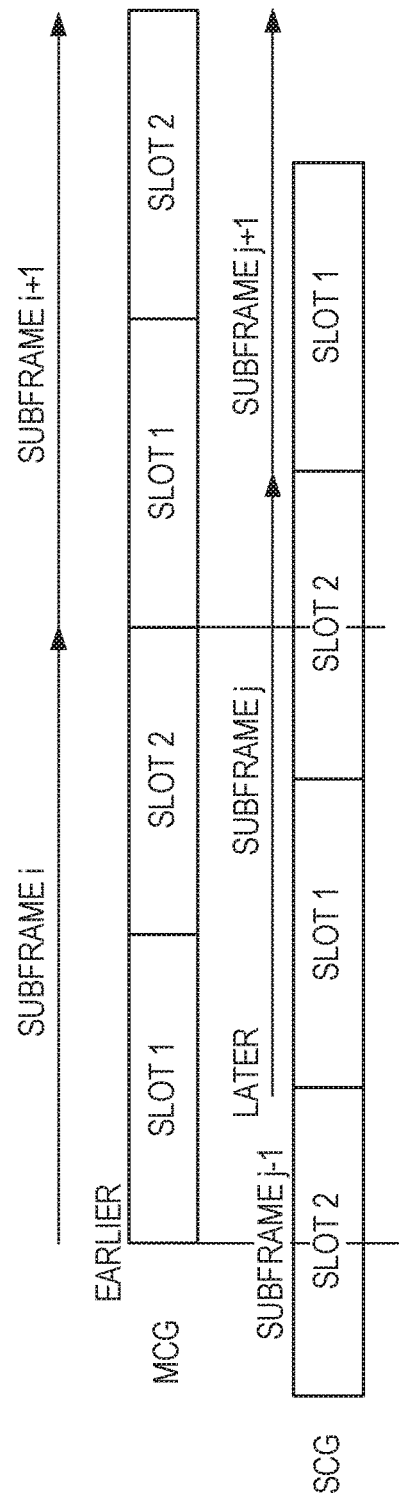
FIG. 9 illustrates subframe pairing for determination of overlapping DRX ON durations according to some embodiments of the present disclosure.

As an example and as illustrated in FIG. 8, if the subframe starting point in time for $i^{th}$ and $j^{th}$ subframes are Ti and Tj as observed at the wireless device, then the wireless device can decide whether there is a partial overlap based on the following:

When |Ti−Tj|<α, slot 1 of $i^{th}$ subframe in the MCG overlaps with slot 1 of $j^{th}$ subframe in the SCG as shown in FIG. 9, and the DRX ON durations are same, then the wireless device can decide that the DRX ON durations are completely overlapping;

When |Ti−Tj|<α, slot 1 of the $(i+x)^{th}$ subframe in the MCG overlaps with slot 1 of the $(j+y)^{th}$ subframe in the SCG where x and y can be anything between {0, . . . , N−1} and {0, . . . , N}, and x≠y respectively, and the DRX ON durations are the same, then the wireless device can decide that the DRX ON durations partially overlap.

If slot 1 of $(i+x)^{th}$ subframe in the MCG overlaps with slot 1 of $(j+y)^{th}$ subframe in the SCG, when x=0 and y>0 and the DRX ON duration in the SCG is larger than the DRX ON duration in the MCG, then the DRX ON duration of the MCG is completely overlapping compared to the DRX ON duration of the SCG, as shown in FIG. 4.

When |Ti−Tj|<α, slot 1 of the $(i+x)^{th}$ subframe in the MCG overlaps with slot 1 of the $(j+y)^{th}$ subframe in the SCG where x and y can be anything between {0, . . . , N−1} and {0, . . . , N}, respectively, the DRX ON durations are different, then the wireless device can decide that the DRX ON durations partially overlap;

where α and β are values predefined in the standard or can be implementation specific, where α<β. As an example, α and β can be taken as 33 μs and 500 μs, respectively.

The wireless device should also take into account any practical warm up or shut down periods needed by the particular implementation of the wireless device to start or stop receiving the MCG or the SCG in making such a determination that the DRX ON durations are overlapping.

As discussed above with respect to steps 200 and 202 of FIG. 7, in some embodiments once the wireless device has determined that there is a partial overlap between the DRX ON durations of the two DRX cycles, the wireless device adapts one or more time instances of the DRX ON duration of the first DRX cycle and/or one or more time instances of the DRX ON duration of the second DRX cycle such that interruptions are avoided. In particular, the time instance(s) are adapted such that the start times of the DRX ON durations of the two DRX cycles are time-aligned and/or the end times of the DRX ON durations of the two DRX cycles are time-aligned.

More specifically, in some embodiments, once the wireless device detects that the DRX ON durations are partially overlapping, then the wireless device can adapt the DRX ON durations so that interruption in at least one of the CGs is avoided. The adaptation is done, for example, by autonomously extending the DRX ON duration of DRX cycle of one of the CGs. The extended part of the DRX ON duration may also be referred to herein as a virtual DRX ON duration or simply a virtual ON duration, i.e. part of the overall DRX ON duration not configured by the network node.

The wireless device stores the information about the adaptive DRX ON duration, i.e. DRX virtual ON duration period. The wireless device retrieves the stored information and uses it during each DRX ON duration to determine at what time instance (i.e., subframe number(s)) the DRX state is to be changed between DRX ON and OFF (e.g., from DRX ON to OFF and/or from DRX OFF to ON). This enables the wireless device to turn ON its receiver(s) at the same time for receiving signals from serving cell(s) of both CGs when changing the DRX state from DRX OFF to ON and/or enables the wireless device to turn OFF its receiver(s) at the same time when changing the DRX state from DRX ON to OFF. This enables the wireless device to avoid interruption in serving cells of at least one of the CGs.

Figure 10A:
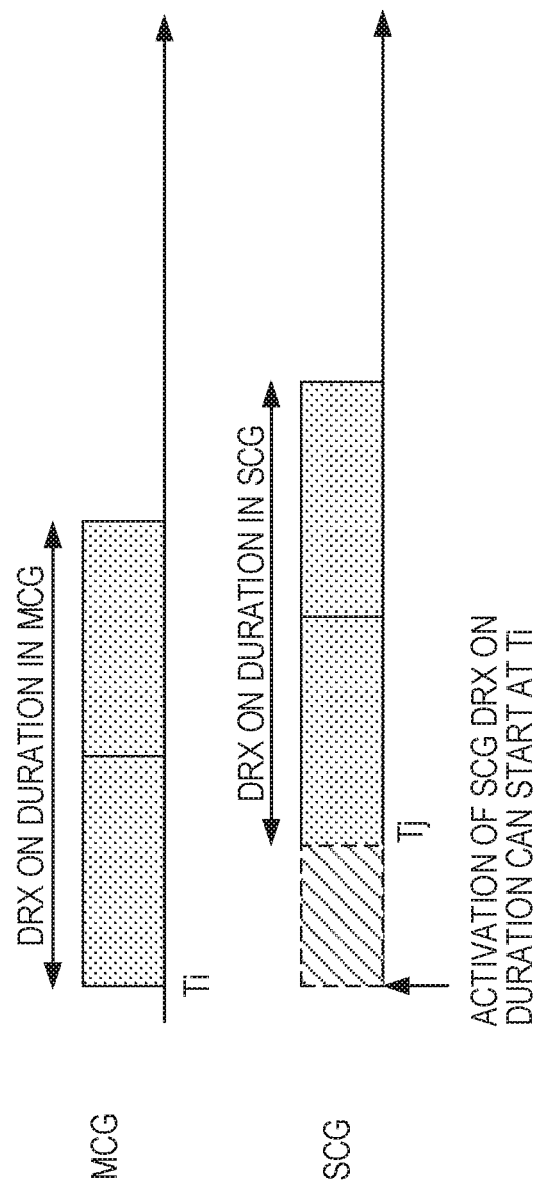
FIGS. 10A and 10B illustrate examples of adaptation of the start and/or end time instances of the DRX ON duration for the MCG and/or the SCG in order to avoid partial overlap according to some embodiments of the present disclosure.
Figure 10B:
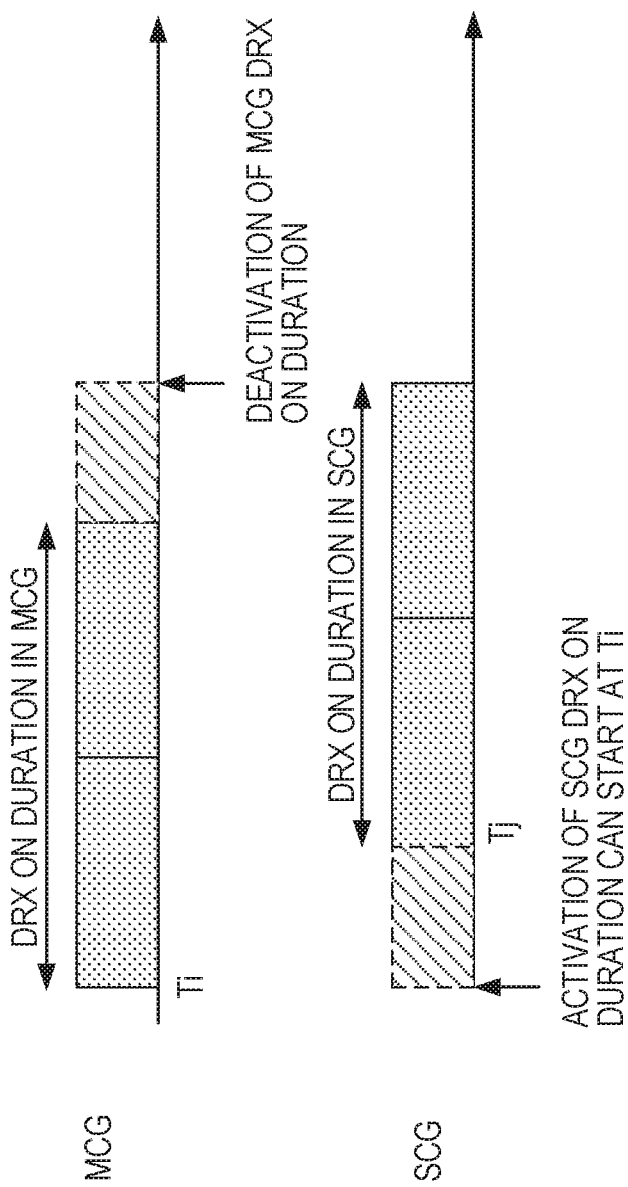

As an example, as shown in FIG. 10A, the wireless device can, with respect to the SCG, start the activation of the DRX ON state for the SCG at time Ti instead of time Tj. This ensures that any possible interruptions to the MCG due to turning on the SCG ON duration can be brought ahead in time by |Ti−Tj| ms. Therefore, the virtual DRX ON duration for the SCG in this example is |Ti−Tj| ms. In this way, the activation or transition of DRX state from OFF to ON in the SCG can be done at the same time as done in case of the MCG. Therefore, interruption to the MCG due to SCG DRX state transition can be avoided. FIG. 10B illustrates a similar example where a virtual ON duration is added to the end of the ON duration for the MCG such that the virtual ON duration for the MCG ends at the same time that the ON duration for the SCG ends. In this way, the deactivation or transition of the DRX state from ON to OFF in the MCG during the ON duration of the SCG is avoided.

As described above with respect to step 204 of FIG. 7, the wireless device may inform the first network node and/or the second network node of the adapted time instance(s). Thus, in some embodiments, the wireless device may signal information associated with the virtual DRX ON duration(s) of the CG(s) to the network node(s) (e.g., the MeNB 12-1 and/or the SeNB 12-2). The information may comprise of an identifier of the CG with the virtual DRX ON duration, length of the virtual DRX ON duration, start and/or end subframe number(s) of the virtual ON duration, etc. The information enables the network node(s) to explicitly determine during which subframes the virtual ON duration occurs for each CG. The network node(s) (e.g., the MeNB 12-1 which performs scheduling for serving cells in MCG), if needed or desired, may also schedule the wireless device during the virtual ON duration(s) of the CG(s). The use of virtual ON duration(s) for scheduling the wireless device will not cause any further increase in the wireless device power consumption beyond what is consumed by the virtual ON duration(s) (i.e., without scheduling). The wireless device may assume that when the virtual ON duration(s) is signaled by the wireless device to the network node(s), then the network node(s) may use this for scheduling the wireless device.

The network node(s) (e.g., the MeNB 12-1) may also use the information on the virtual ON duration(s) to find a configuration which reduces power consumption by the wireless device. For example, in FIG. 9, the network node may determine that the virtual ON duration could be improved by starting the DRX ON duration earlier on the SCG, and better aligning the DRX between the MCG and the SCG.

Figure 11:
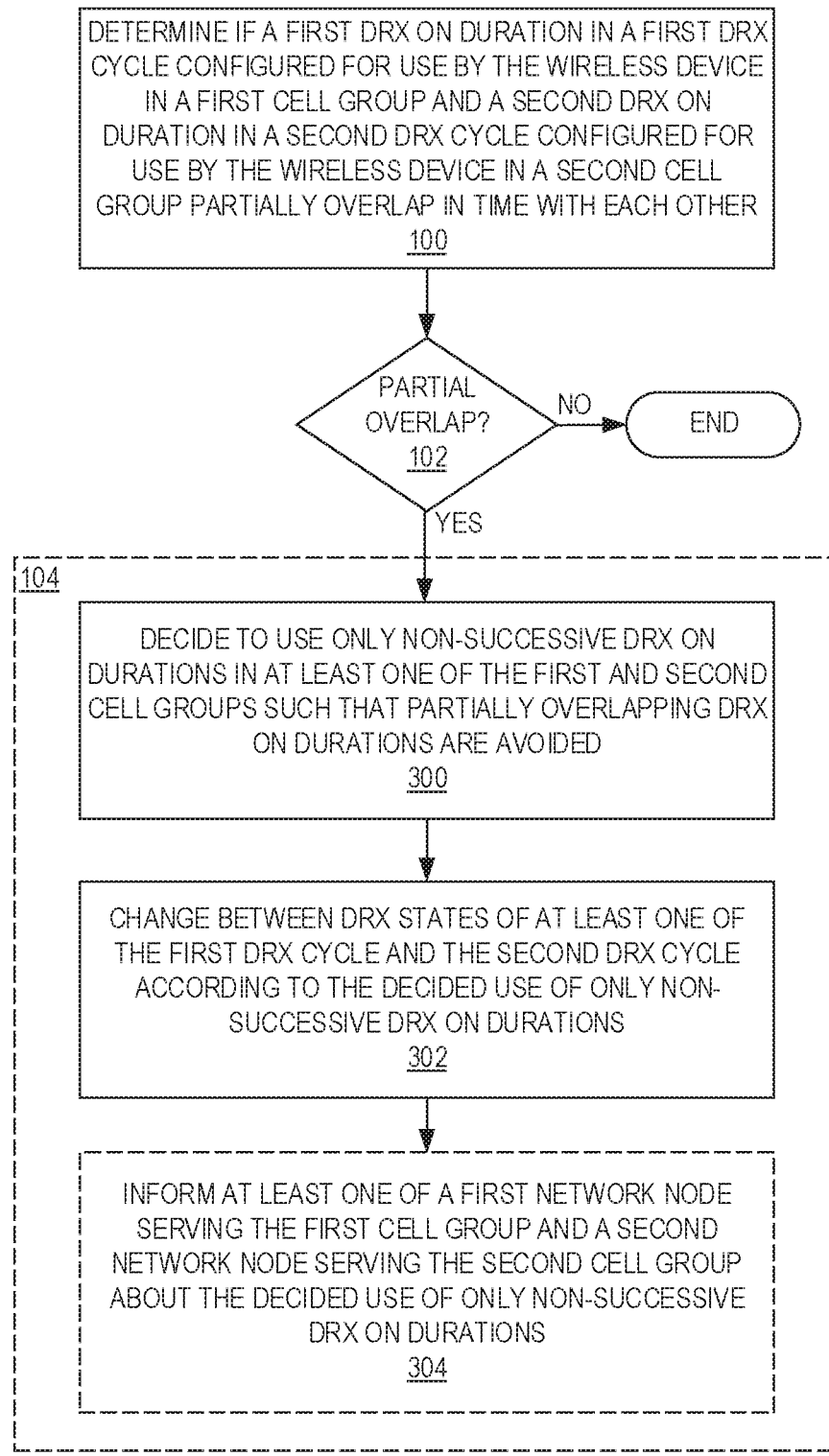
FIG. 11 is a flow chart that illustrates the process of FIG. 6 in more detail according to some other embodiments of the present disclosure.

FIG. 11 is a flow chart that illustrates the process of FIG. 6 in more detail according to some embodiments of the present disclosure. In general, the process of FIG. 11 is performed by the wireless device (e.g., the UE 14-1 or the UE 14-2) to avoid interruptions due to partial overlapping of DRX ON durations of the MCG and SCG DRX cycles for DC operation. As illustrated and as discussed above, the wireless device determines if a first DRX ON duration in a first DRX cycle configured for use by the wireless device in a first CG (e.g., the MCG) and a second DRX ON duration in a second DRX cycle configured for use by the wireless device in a second CG (e.g., the SCG) partially overlap in time with each other (step 100).

In other words, the wireless device (e.g., the UE 14-1 or 14-2) determines if there is any overlap in time between the DRX ON durations of the MCG DRX cycle (i.e., the DRX cycle configured at the wireless device for serving cells in the MCG) and the DRX ON durations of the SCG DRX cycle (i.e., the DRX cycle configured at the wireless device for serving cells in the SCG). In this context, overlap in time means that starting or stopping the receiver of the wireless device for one CG would cause interruption to downlink control channel (e.g., PDCCH for LTE) reception required on the other CG.

If there is no partial overlap between the DRX ON durations in the first and second DRX cycles (step 102, NO), the process ends. Conversely, if there is a partial overlap between the DRX ON durations in the first and second DRX cycles (step 102, YES), the wireless device takes one or more actions that mitigate the partial overlap between the first DRX ON duration in the first DRX cycle configured for use by the wireless device in a first CG (e.g., the MCG) and the second DRX ON duration in the second DRX cycle configured for use by the wireless device in a second CG (e.g., the SCG) (step 104).

More specifically, in this example, the one or more actions include deciding to use only non-successive DRX ON durations in at least one of the first and second CGs such that partially overlapping DRX ON durations are avoided (step 300). Thus, in this embodiment, the wireless device may decide to use only non-successive DRX ON durations in one or both of the CGs if the DRX cycles for two CGs (i.e., the MCG and the SCG) have partially overlapping ON durations. The unused DRX ON duration is called a virtual DRX OFF duration herein (or simply a virtual OFF duration). That is, the wireless device is configured to use a DRX ON duration but does not actually use the DRX ON duration in practice (such that the DRX ON duration becomes a virtual DRX OFF duration).

In a particular example, the wireless device may alternate between virtual DRX OFF duration and DRX ON duration periodically. During the virtual DRX OFF duration of the DRX cycle in a CG, the receiver of the wireless device is unable to receive signals from that particular CG. In other words, the receiver of the wireless device is turned OFF during the virtual DRX OFF duration in one CG and ON during the DRX ON duration in the other CG such that the partial overlap of the DRX ON durations of the two CGs is avoided. Therefore, in this context, the term "use" herein means that the receiver of the wireless device becomes active in the ON duration of the DRX cycle to receive signals from serving cells of the corresponding CG.

The wireless device changes between DRX states of the DRX cycle(s) of the at least one CG according to the decided use of only non-successive DRX ON durations (step 302). Further, in some embodiments, the wireless device optionally informs at least one of the first network node and the second network node (i.e., at least one of the MeNB 12-1 and the SeNB 12-2) about the decided use of only non-successive DRX ON durations (step 304).

Figure 12:
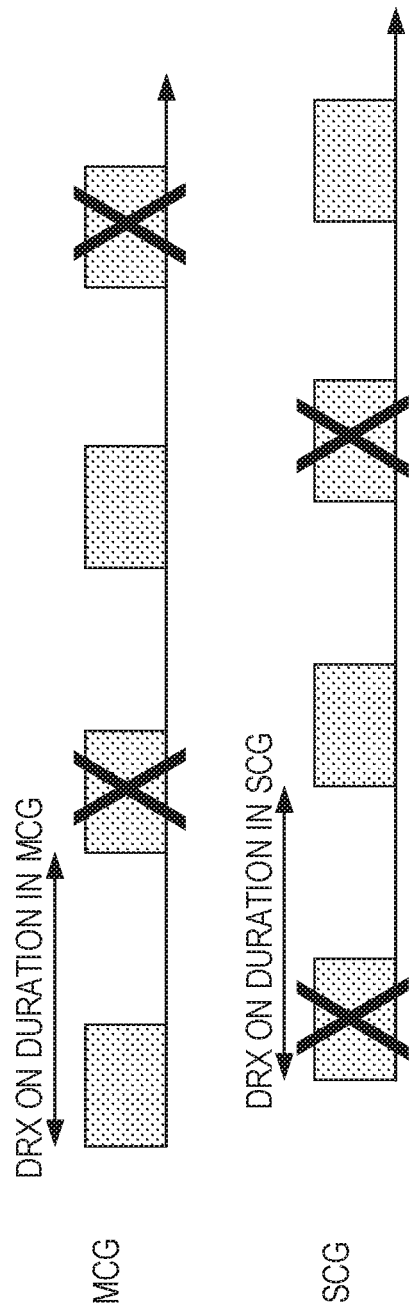
FIG. 12 is an example of the use of only non-successive DRX ON durations in both the DRX cycle of the MCG and the DRX cycle of the SCG in order to avoid partial overlap between the DRX ON durations in the DRX cycles of the MCG and the SCG according to some embodiments of the present disclosure.

As an example of the use of only non-successive DRX ON durations, FIG. 12 illustrates a scenario where the wireless device may decide to omit the crossed subframes for respective DRX ON duration, thus interruption at a DRX ON duration in one CG due to DRX state transition in another CG can be avoided. FIG. 12 illustrates an example for a time division mode, which means that the DRX ON duration of the wireless device in the MCG and the SCG do not occur at the same time; rather in time-division fashion. In the example of FIG. 12, only non-successive DRX ON durations are used in both the MCG and the SCG.

Figure 13:
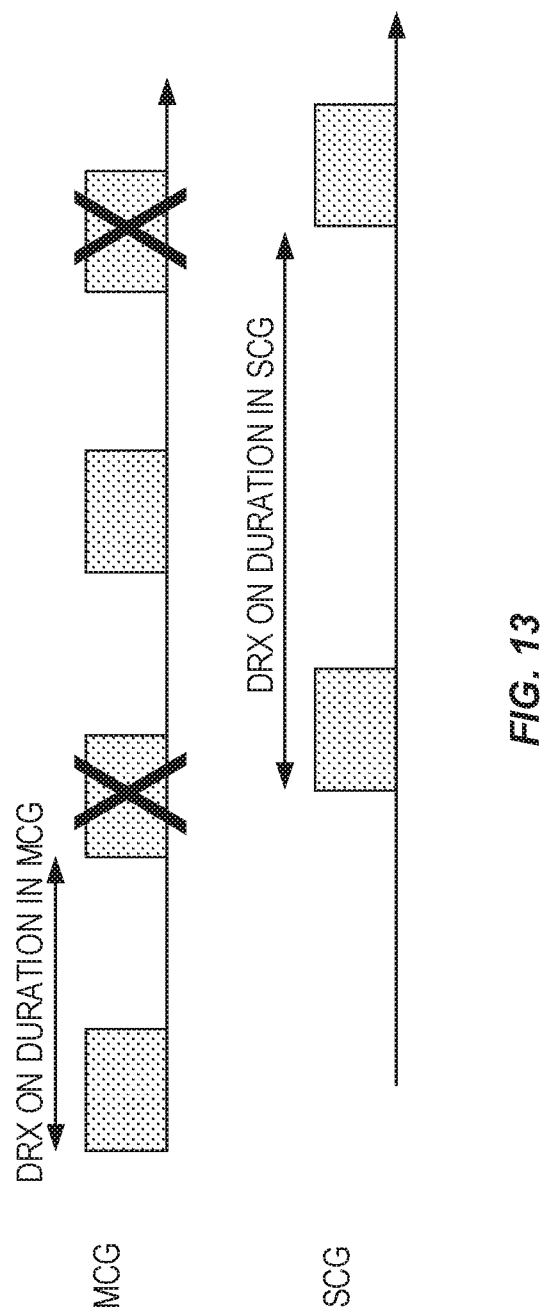
FIG. 13 is another example of the use of only non-successive DRX ON durations in the DRX cycle of only one of the MCG and the SCG in order to avoid partial overlap between the DRX ON durations in the DRX cycles of the MCG and the SCG according to some embodiments of the present disclosure.

In yet another facet of this embodiment, the wireless device may apply the alternating principle (i.e., alternating between virtual DRX OFF duration and DRX ON duration periodically) only for the DRX cycle in one of the CGs, e.g. only in SCG or only in MCG. On the other hand, the wireless device may use every DRX ON duration of the DRX cycle in the other CG. This will, for example, allow the wireless device to receive in all ON durations in one CG but will cause interruption in alternating ON durations. FIG. 13 illustrates an example in which only non-successive DRX durations are used in only one of the CGs, which in this example is the MCG.

The wireless device may be allowed to operate by alternating its receiver between DRX ON and virtual DRX OFF durations of DRX cycle for each CG based on: a predefined rule, wireless device implementation, and/or a predefined rule to be applied by the wireless device only when permitted by the network node (e.g., the MeNB 12-1).

During the virtual DRX OFF duration the network node also avoids scheduling the wireless device. To enable such network node behavior, the wireless device may also indicate to the network node whether the wireless device is applying any one or more of the above alternating principles in one or more CGs, as described above with respect to step 304 of FIG. 11. The wireless device may further indicate the pattern of DRX ON and virtual DRX OFF durations for each CG where the wireless device applies the alternating principle. Based on the received information, the network node may adapt its scheduling; for example, it may not schedule the wireless device during the virtual DRX OFF durations.

Figure 14:
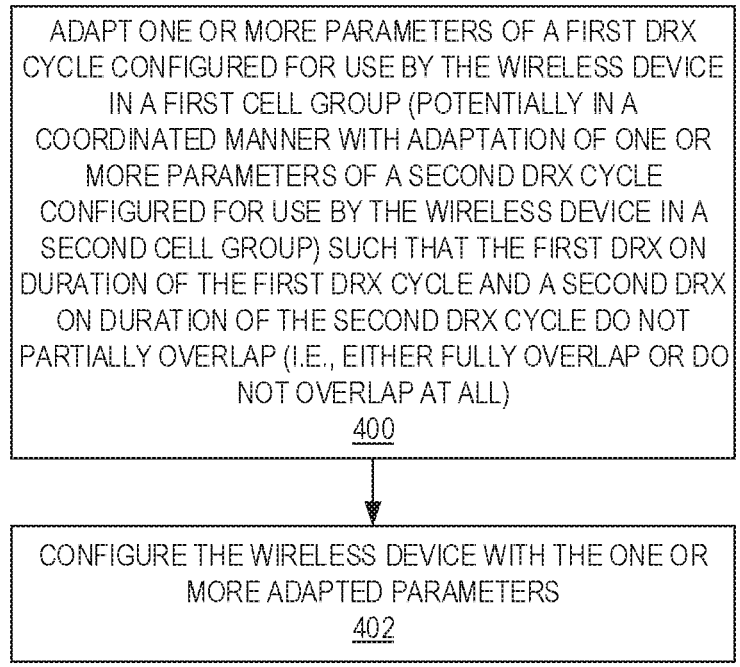
FIG. 14 is a flow chart that illustrates the operation of a network node according to some embodiments of the present disclosure.

Now turning to the operation of the network node (e.g., the MeNB 12-1 or the SeNB 12-2), FIG. 14 is a flow chart that illustrates the operation of a network node according to some embodiments of the present disclosure. Here, the network node(s) deliberately configures the wireless device with DRX cycle parameters which would avoid any interruption at the wireless device in one CG due to change of DRX states in another CG. As illustrated, the network node (e.g., the MeNB 12-1) adapts one or more parameters (e.g., DRX ON duration length, DRX cycle periodicity, and/or the like) of a first DRX cycle configured for use by the wireless device (e.g., the UE 14-1) in a first CG (e.g., the MCG) such that the first DRX ON duration of the first DRX cycle and a second DRX ON duration of a second DRX cycle configured for use by the wireless device in a second CG (e.g., the SCG) do not partially overlap (i.e., either fully overlap or do not overlap at all) (step 400). In some embodiments, the adaption is performed in a coordinated manner with adaption of one or more parameters of the second DRX cycle by a second network node (e.g., the SeNB 12-2). The network node configures the wireless device with the one or more adapted parameters (step 402).

Figure 15:
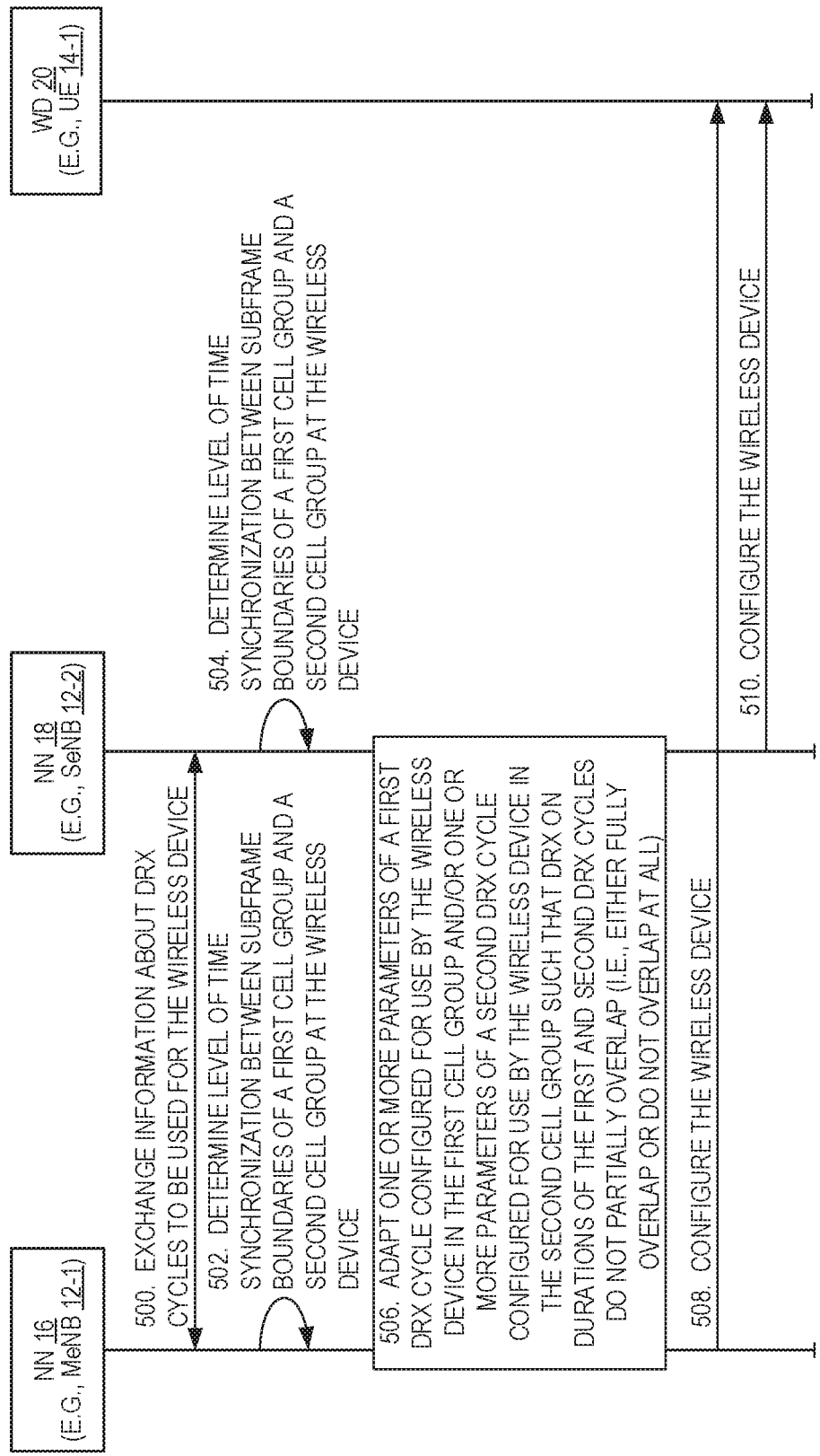
FIG. 15 illustrates a process performed by first and second network nodes, respectively, (e.g., a MeNB and a SeNB) to adapt one or more DRX parameters configured for use by a wireless device (e.g., a UE) such that DRX ON durations for the DRX cycles for CGs (e.g., a MCG and a SCG) configured for use by the wireless device do not partially overlap according to some embodiments of the present disclosure.

FIG. 15 illustrates a process performed by first and second network nodes 16 and 18 (e.g., the MeNB 12-1 and the SeNB 12-2) to adapt one or more DRX parameters configured for use by a wireless device 20 (e.g., the UE 14-1) such that DRX ON durations for the DRX cycles for CGs (e.g., the MCG and the SCG) configured for use by the wireless device 20 do not partially overlap according to some embodiments of the present disclosure. As illustrated, the network nodes 16 and 18 configuring a first DRX cycle for a first CG (e.g., the MCG) and a second DRX cycle for a second CG (e.g., the SCG) respectively may coordinate or communicate with each other for exchanging information about their DRX cycles to be used for the wireless device 20 (step 500). The network nodes 16 and 18 determine a level of time synchronization (i.e., received time difference at the wireless device 20) between subframe boundaries of the two CGs experienced at the wireless device 20 (steps 502 and 504). The network node 16, 18 can determine this explicitly based on indication or information received from the wireless device 20 and/or implicitly based on the transmit time difference between subframe boundaries of the CGs and the difference in the Timing Advance (TA) applied by wireless device 20 for transmitting in the first CG and the second CG.

The network nodes 16 and 18 adapt the DRX cycle parameters of the first and the second DRX cycles, respectively, such that the DRX ON durations of their respective DRX cycles do not partially overlap (i.e., either fully overlap or do not overlap at all) thereby avoiding interruption in at least one CG due to changing of DRX states in the other CG (step 506). The adaptation is based on the coordination of DRX cycle parameters between the CGs as well as on the determined level of time synchronization between subframe boundaries of the CGs. The network nodes 16 and 18 configure the wireless device 20 with their respective first and second DRX cycle configurations which comprise of the adapted DRX cycle parameters (steps 508 and 510).

In some embodiments, feedback from the wireless device 20 on the virtual DRX ON duration may be used by the network node 16, 18 to determine strategies to align, or improve, the alignment of the first and second DRX cycles, which will improve power consumption by the wireless device 20 (by making the overall virtual DRX ON duration shorter). A non-limiting example of such feedback would be an indication of the start time of the virtual DRX cycle relative to the MCG timing and the end time of the virtual DRX cycle relative to the MCG timing. Based on this feedback, the network node 16, 18 (e.g., the MeNB 16 for the MCG) could determine adjustments to the MCG DRX cycle or the SCG DRX cycle to reduce the overall duration of the virtual DRX ON, thereby saving power at the wireless device 20.

The above general principle of adapting the DRX cycles at the network node(s) 16, 18 to avoid interruption in at least one CG is elaborated with the following exemplary embodiments.

Figure 16:
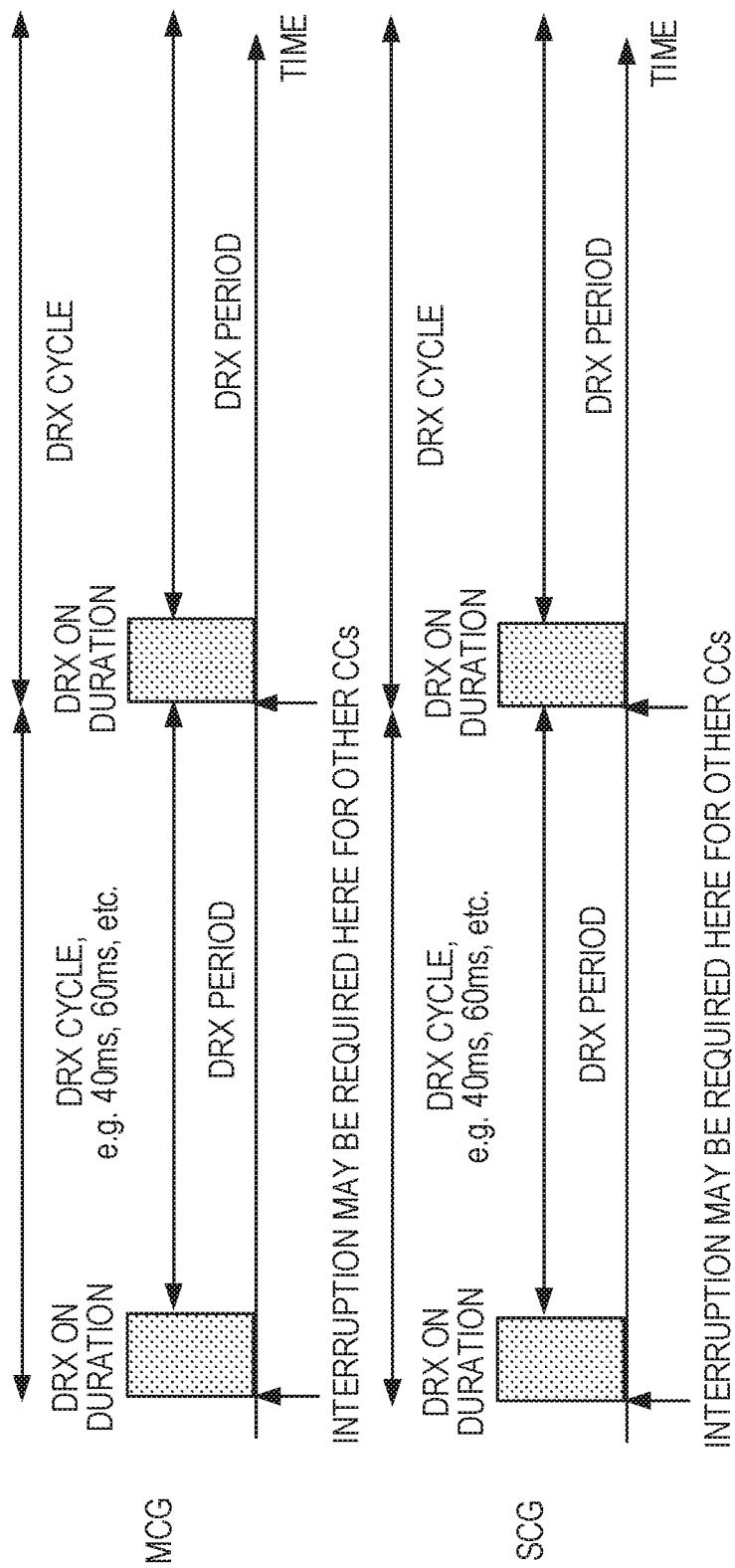
FIG. 16 illustrates an example in which the network nodes adapt DRX parameters for both the DRX cycle of the MCG and the DRX cycle for the SCG such that the DRX ON durations of the DRX cycles of the MCG and the SCG fully overlap according to some embodiments of the present disclosure.

In some embodiments, the adaptation of the DRX cycles is such that the DRX cycles (and the DRX ON durations of the DRX cycles) for the CGs are fully (time) aligned. In these embodiments, the DRX parameters such as DRX periodicity, DRX ON durations, etc. for both CGs are coordinated between the first and the second network nodes 16 and 18. Based on the exchange of information, the length of ON durations and DRX periods of the first and the second DRX cycles are fully aligned. Also, the ON duration parameters for both DRX cycles are selected such that the ON durations fully overlap. This is shown in FIG. 16. As illustrated in FIG. 16, the DRX ON durations of both CGs (i.e., MCG and SCG) completely overlap with each other. As a result, the change of states between DRX OFF and DRX ON in one CG by the wireless device 20 does not cause any interruption on serving cells of the other CG.

To fully align DRX cycle parameters in the two CGs, the first and second network nodes 16 and 18 may have to configure the start of the ON durations in their respective CGs at different subframes. For example, if the serving cells in the first and the second CGs are shifted by two subframes, then in one CG, the DRX ON duration may start in subframe L whereas, in the second CG, the DRX ON duration may start in subframe L+2.

In asynchronous DC, it may be difficult to perfectly align the MCG and the SCG. Nevertheless, if they are close to alignment, then the duration of the virtual DRX ON time (as adapted by the wireless device) 20 will be close to the on duration for the MCG and the SCG.

Figure 17:
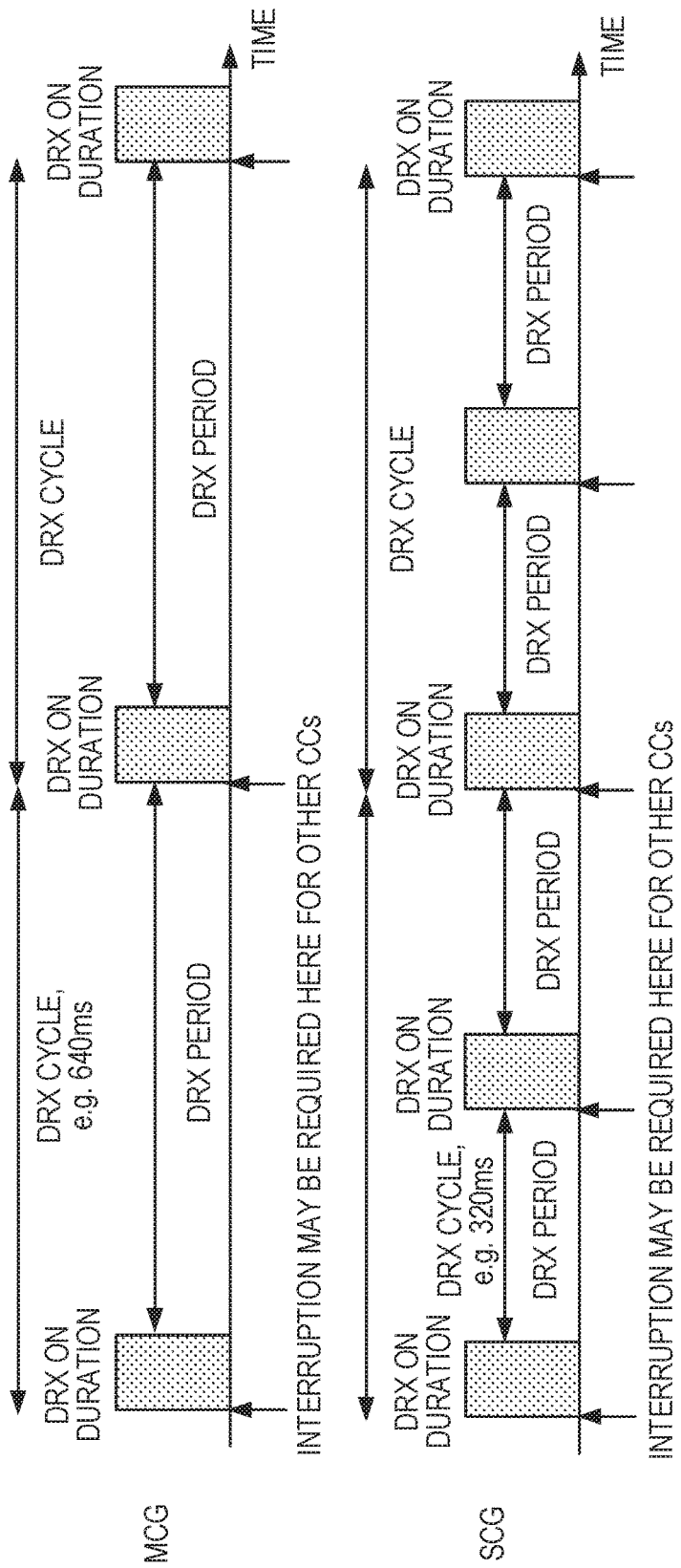
FIG. 17 illustrates an example in which the network nodes adapt the DRX cycles of the MCG and the SCG such that the DRX cycles for the MCG and the SCG have different DRX cycles with aligned DRX ON durations according to some embodiments of the present disclosure.

In some other embodiments, the network nodes 16 and 18 perform the adaptation such that the DRX cycles for the CGs have different DRX cycles with (time) aligned DRX ON durations. More specifically, in some exemplary implementations, the first and the second network nodes 16 and 18 may configure the wireless device 20 with their respective DRX cycles for use in the first CG and the second CG respectively with the following DRX parameters: same DRX duration (e.g., 5 ms) in both CGs, fully time aligned (i.e., fully overlapping) DRX ON durations, and different DRX cycle periodicities, e.g. first DRX cycle period for MCG=320 ms and second DRX cycle period for SCG=640 ms. This also avoids any partial overlap between DRX ON durations of the two DRX cycles in the two CGs. This in turn avoids any interruption caused by changing between DRX states in one CG to another CG. One example of this arrangement is shown in FIG. 17 where different DRX cycles are configured for the MCG and the SCG and the DRX cycle of one CG is an integer multiple of DRX cycle of the other CG.

Figure 18:
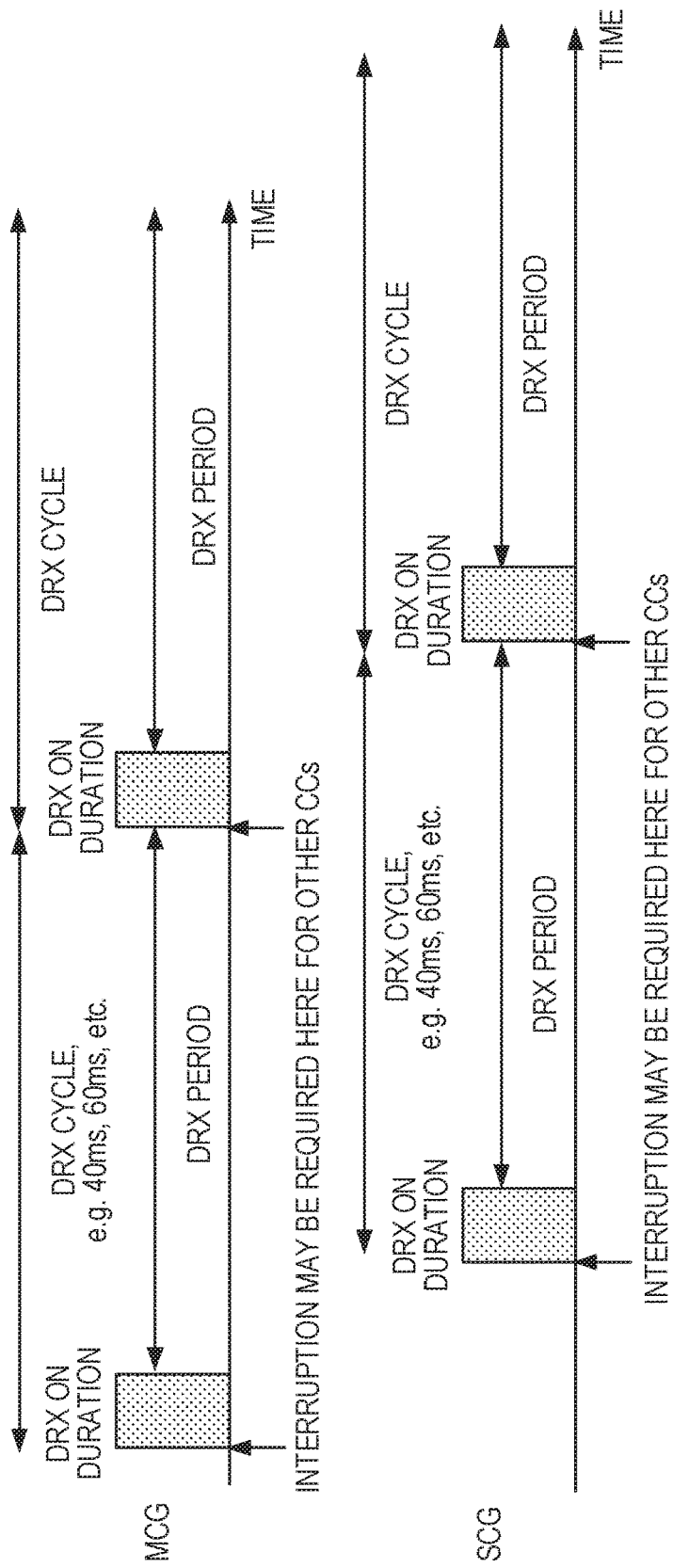
FIG. 18 illustrates an example in which the network nodes adapt the DRX cycles of the MCG and the SCG such that the DRX cycles for the MCG and the SCG have fully non-overlapping DRX ON durations according to some embodiments of the present disclosure.

In some other embodiments, the network nodes 16 and 18 adapt the DRX cycles for the CGs such that the DRX cycles have fully non-overlapping DRX ON durations. In this exemplary implementation, the DRX cycles between the CGs (i.e., between the MCG and the SCG) are not aligned in that their DRX ON durations may be completely non-overlapping. One example of this arrangement is shown in FIG. 18. In this case, the interruptions due to changing of states between DRX OFF and DRX ON from the MCG will occur in the DRX OFF period of the SCG and vice versa. Therefore, no interruption is caused by the MCG on the SCG or vice versa due to the change of their DRX states. However, due to completely non-overlapping DRX ON durations, the power saving is less compared to the case where DRX ON durations fully overlap.

In some embodiments, the first and/or second network node 16, 18 may use one or more criteria to select one of the three alternative principles described above for adapting the DRX cycle. Examples of criteria are: amount of wireless device battery saving to be achieved, e.g. fully aligned DRX cycles in case UE battery power is below a threshold; amount of data in traffic, e.g. longer ON durations with aligned ON durations if there is more data; and type of service, e.g. only align DRX ON duration or fully non-overlapping DRX cycles with longer DRX cycle in a CG serving non-real time service while shorter DRX cycle in CG serving real time service.

One of the first network node 16 and the second network node 18 may decide which method to use. For example, MCG (i.e., the network node 16, 18 for the MCG) may decide based on the above mentioned one or more criteria which method to use. In this case, the MCG may also inform the SCG (i.e., the network node 16, 18 for the SCG) about the selected method. The MCG may also decide its own DRX cycle parameters while the SCG may adapt its parameters according to the selected method and DRX cycle parameters of the MCG.

Figure 19:
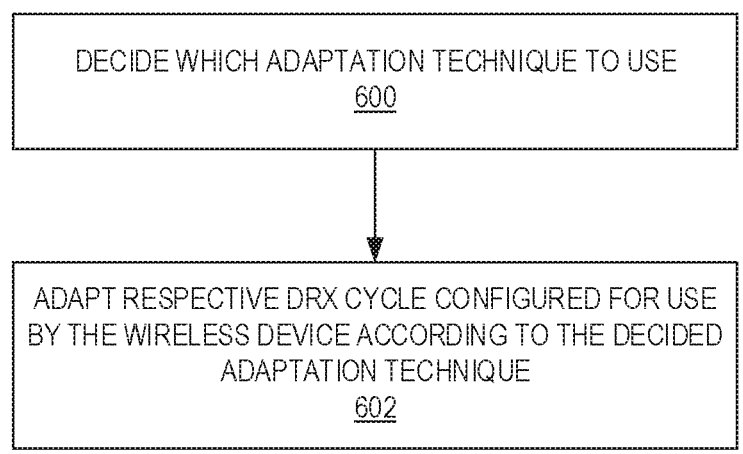
FIG. 19 is a flow chart that illustrates the operation of a network node to select which adaptation technique to use according to some embodiments of the present disclosure.

In this regard, FIG. 19 is a flow chart that illustrates the operation of the network node 16, 18 to select which adaptation technique to use according to some embodiments of the present disclosure. As illustrated, the network node 16, 18 decides, or selects, which adaptation technique to use for adapting the DRX cycles of the CGs to avoid partial overlap of DRX ON durations, as described above (step 600). The network node 16, 18 adapts the respective DRX cycle configured for use by the wireless device 20 for the respective CG according to the decided adaptation technique (step 602).

Figure 20:
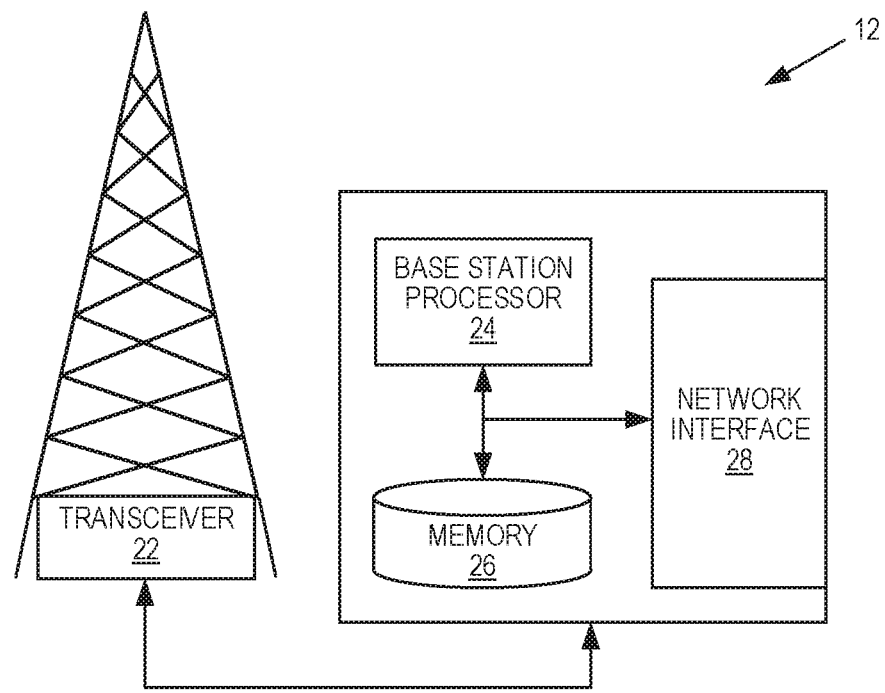
FIGS. 20 and 21 are block diagrams of example embodiments of a network node according to some embodiments of the present disclosure.

FIG. 20 is a schematic diagram of a network node according to some embodiments of the present disclosure. In one example, the network node is an eNB 12 (e.g., more generally a base station) such as, for example, the MeNB 12-1 or the SeNB 12-2 of the UE 14-1. The eNB 12 can be an LTE base station (an eNB or PCell base station) or another type of base station that can communicate wirelessly with a wireless device/UE (e.g., an SCell radio station operating in, e.g., an unlicensed spectrum). In this example, the eNB 12 (or more generally the base station) includes a transceiver 22, a processor 24 (e.g., one or more Central Processing Units (CPUs), one or more Application Specific Integrated Circuits (ASICs), one or more Field Programmable Gate Arrays (FPGAs), or the like, or any combination thereof), memory 26, and a network interface 28. The transceiver 22 allows the base station to send and receive wireless signals. The processor 24 can execute instructions stored in the memory 26 based on signals received wirelessly via the transceiver 22. The network interface 28 allows the base station to interact with a core network, such as sending and receiving signals via a wired link. The base station can communicate wirelessly with one or more wireless devices (e.g., one or more of the UEs 14).

In some embodiments, a computer program including instructions which, when executed by at least one processor, causes the processor to carry out the functionality of the network node 16 (or the network node 18) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 21:
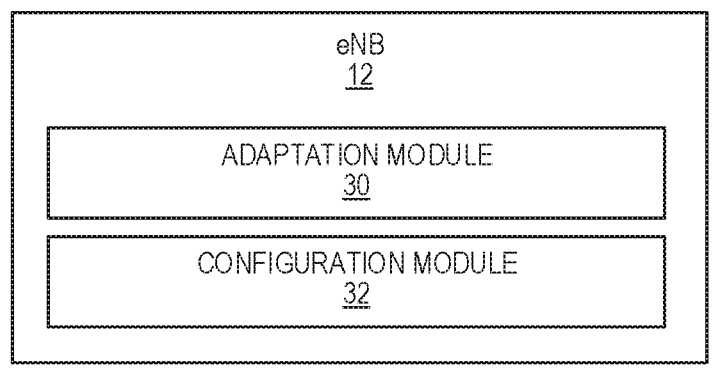

FIG. 21 is a block diagram of a network node according to some other embodiments of the present disclosure. In this particular example, the network node is an eNB 12 (or more generally a base station). As illustrated, the eNB 12 includes an adaptation module 30 and a configuration module 32, each of which is implemented in software. The adaptation module 30 operates to adapt one or more parameters of a first DRX cycle configured for use by the wireless device 20 in a first CG such that the first DRX ON duration of the first DRX cycle and a second DRX ON duration of a second DRX cycle do not partially overlap, as described above with respect to step 400 of FIG. 14. The configuration module 32 operates to configure the wireless device with the one or more adapted parameters, as described above with respect to step 402 of FIG. 14.

Figure 22:
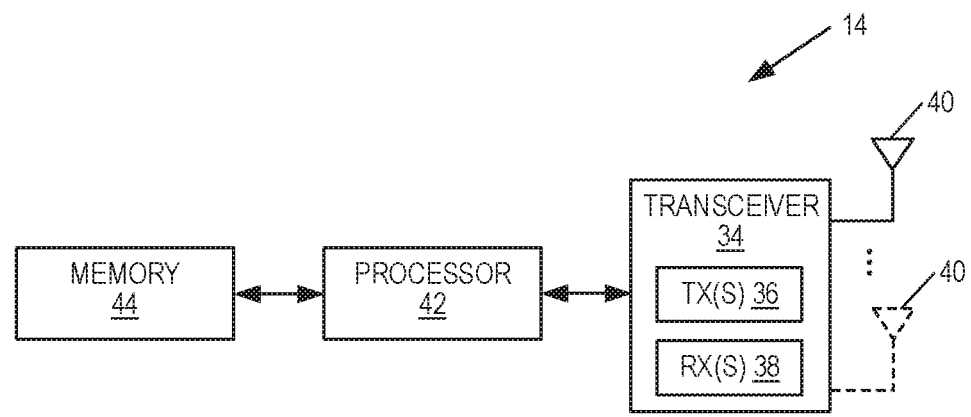
FIGS. 22 and 23 are block diagrams of example embodiments of a wireless device according to some embodiments of the present disclosure.

FIG. 22 is a schematic diagram of a UE 14 (or more generally a wireless device) according to some embodiments of the present disclosure. In some embodiments, the UE 14 is configured to send and receive wireless signals using resources from the licensed LTE spectrum, an unlicensed spectrum, or both. The UE 14 can send and receive wireless signals to and from the eNB 12, including a MeNB and a SeNB, as described above. The UE 14 includes a transceiver 34 (which includes one or more transmitters 36 and one or more receivers 38 coupled to one or more antennas 40), a processor 42 (e.g., one or more CPUs, one or more ASICs, one or more FPGAs, or the like, or any combination thereof), and memory 44. The transceiver 34 allows the UE 14 to send and receive wireless signals. The processor 42 can execute instructions stored in the memory 44 based on signals received wirelessly via the transceiver 34.

In some embodiments, a computer program including instructions which, when executed by at least one processor, causes the processor to carry out the functionality of the UE 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 23:
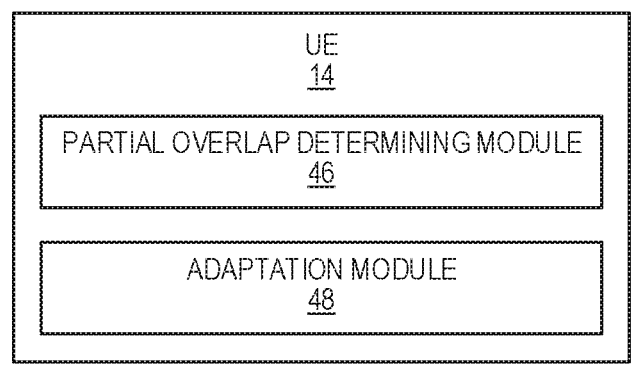

FIG. 23 is a block diagram of a UE 14 (or more generally a wireless device) according to some other embodiments of the present disclosure. As illustrated, the UE 14 includes a partial overlap determining module 46 and an adaptation module 48, each of which is implemented in software. The partial overlap determining module 46 operates to determine whether a first DRX ON duration in a first DRX cycle configured for use by the UE 14 in a first CG and a second DRX ON duration in a second DRX cycle configured for use by the UE 14 in a second CG partially overlap in time with each other, as described above with respect to step 100 of FIG. 6. If there is a partial overlap, the adaptation module 48 operates to take one or more actions that mitigate the partial overlap, as described above with respect to step 104 of FIG. 6.

The following acronyms are used throughout this disclosure.
μs Microsecond
3GPP Third Generation Partnership Project
ACK Acknowledgement
ASIC Application Specific Integrated Circuit
BSC Base Station Controller
BTS Base Transceiver Station
CA Carrier Aggregation CC Component Carrier
CDMA Code Division Multiple Access
CG Cell Group
CPE Customer Premises Equipment
CPU Central Processing Unit
CSI Channel State Information
D2D Device to Device
DAS Distributed Antenna System
DC Dual Connectivity
DRX Discontinuous Reception
DTX Discontinuous Transmission
EDGE Enhanced Data Rates for Global System for Mobile Communications Evolution
eNB Enhanced or Evolved Node B
E-SMLC Evolved Serving Mobile Location Centre
FDD Frequency Division Duplexing
FPGA Field Programmable Gate Array
GERAN Global System for Mobile Communications Enhanced Data Rates for Global System for Mobile Communications Evolution Radio Access Network
GSM Global System for Mobile Communications
HARQ Hybrid Automatic Repeat Request
HSPA High Speed Packet Access
km Kilometer
LEE Laptop Embedded Equipment
LME Laptop Mounted Equipment
LTE Long Term Evolution
M2M Machine to Machine
MAC Medium Access Control
MCG Master Cell Group
MDT Minimization of Drive Tests
MeNB Master Enhanced or Evolved Node B
MME Mobility Management Entity
MRTD Maximum Receive Timing Difference
ms Millisecond
MSC Mobile Switching Centre
MSR Multi-Standard Radio
O&M Operation and Maintenance
OSS Operations Support System
PCell Primary Cell
PDA Personal Digital Assistant
PDCCH Physical Downlink Control Channel
pSCell Primary Secondary Cell
RAN Radio Access Network
RAT Radio Access Technology
Rel-12 Release 12
RLM Radio Link Monitoring
RNC Radio Network Controller
RRC Radio Resource Control
RRH Remote Radio Head
RRU Remote Radio Unit
Rx Receive
SCC Secondary Component Carrier
SCell Secondary Cell
SCG Secondary Cell Group
SeNB Secondary Enhanced or Evolved Node B
SFN System Frame Number
SON Self-Organizing Network
TA Timing Advance
TDD Time Division Duplexing
Tx Transmit
UE User Equipment
USB Universal Serial Bus
VoIP Voice over Internet Protocol
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of multi-connectivity operation of a wireless device in Discontinuous Reception, DRX, comprising:
determining whether a first DRX ON duration in a first DRX cycle configured for use by the wireless device in a first cell group for multi-connectivity operation and a second DRX ON duration in a second DRX cycle configured for use by the wireless device in a second cell group for multi-connectivity operation partially overlap in time with one another;
upon determining that the first DRX ON duration and the second DRX ON duration partially overlap in time with one another, taking one or more actions that mitigate the partial overlap between the first DRX ON duration in the first DRX cycle configured for use by the wireless device in the first cell group and the second DRX ON duration in the second DRX cycle configured for use by the wireless device;
deciding to use only non-successive DRX ON durations in at least one of the first cell group and the second cell group such that partially overlapping DRX ON durations between the first and second DRX cycles of the first and second cell groups are avoided; and
changing between DRX states in at least one of the first DRX cycle and the second DRX cycle according to the decided use of only the non-successive DRX ON durations in the at least one of the first cell group and the second cell group.

2. The method of claim 1 wherein taking the one or more actions comprises taking the one or more actions such that a transition between a DRX ON state and a DRX OFF state with respect to the first DRX ON duration is avoided during the second DRX ON duration.

3. The method of claim 1 wherein taking the one or more actions comprises taking the one or more actions such that a transition between a DRX ON state and a DRX OFF state with respect to the second DRX ON duration is avoided during the first DRX ON duration.

4. The method of claim 1 wherein taking the one or more actions comprises taking the one or more actions such that:
a transition between a DRX ON state and a DRX OFF state with respect to the first DRX ON duration is avoided during the second DRX ON duration; and
a transition between the DRX ON state and the DRX OFF state with respect to the second DRX ON duration is avoided during the first DRX ON duration.

5. The method of claim 1 wherein determining whether the first DRX ON duration and the second DRX ON duration partially overlap in time with one another comprises determining whether the first DRX ON duration and the second DRX ON duration partially overlap in time with one another based on a comparison of one or more DRX parameters for the first DRX cycle and the second DRX cycle, the one or more DRX parameters comprising at least one of: DRX duration and DRX cycle length.

6. The method of claim 1 wherein determining whether the first DRX ON duration and the second DRX ON duration partially overlap in time with one another comprises determining whether the first DRX ON duration and the second DRX ON duration partially overlap in time with one another based on a comparison of a system frame number and one or more subframe numbers within a frame in which the first DRX ON duration will be implemented and a system frame number and one or more subframe numbers within a frame in which the second DRX ON duration will be implemented.

7. The method of claim 1 wherein determining whether the first DRX ON duration and the second DRX ON duration partially overlap in time with one another comprises determining whether the first DRX ON duration and the second DRX ON duration partially overlap in time with one another taking into consideration whether the first cell group and the second cell group are synchronized or unsynchronized with respect to a received time difference of signals between subframe boundaries of the first cell group and the second cell group at the wireless device in multi-connectivity operation.

8. The method of claim 1 wherein taking the one or more actions comprises:
adapting one or more time instances at which a DRX state transitions between a DRX ON state and a DRX OFF state for at least one of the first DRX ON duration of the first DRX cycle and the second DRX ON duration of the second DRX cycle such that: (a) one or more transitions between the DRX ON state and the DRX OFF state with respect to the first DRX ON duration in the first DRX cycle are avoided during the second DRX ON duration in the second DRX cycle and/or (b) one or more transitions between the DRX ON state and the DRX OFF state with respect to the second DRX ON duration in the second DRX cycle are avoided during the first DRX ON duration in the first DRX cycle; and
changing between the DRX ON state and the DRX OFF state in the at least one of the first DRX cycle and the second DRX cycle at the one or more time instances.

9. The method of claim 8 wherein adapting the one or more time instances comprises adapting the one or more time instances such that: (a) start times of the first DRX ON duration and the second DRX ON duration are time-aligned and/or (b) end times of the first DRX ON duration and the second DRX ON duration are time-aligned.

10. The method of claim 1 wherein taking the one or more actions comprises:
deciding to use only non-successive DRX ON durations in at least one of the first cell group and the second cell group such that partially overlapping DRX ON durations between the first and second DRX cycles of the first and second cell groups are avoided; and
changing between DRX states in at least one of the first DRX cycle and the second DRX cycle according to the decided use of only the non-successive DRX ON durations in the at least one of the first cell group and the second cell group.

11. The method of claim 1 wherein the first cell group and the second cell group are non-synchronized with respect to the received time difference of signals between subframe boundaries of the first cell group and the second cell group at the wireless device in multi-connectivity operation.

12. The method of claim 1 wherein the first cell group and the second cell group are synchronized with respect to the received time difference of signals between subframe boundaries of the first cell group and the second cell group at the wireless device in multi-connectivity operation.

13. A wireless device enabled to provide multi-connectivity operation in Discontinuous Reception, DRX, comprising:
a transceiver;
a processor; and
memory containing instructions that are executable by the processor whereby the wireless device is operable to:
determine whether a first DRX ON duration in a first DRX cycle configured for use by the wireless device in a first cell group for multi-connectivity operation and a second DRX ON duration in a second DRX cycle configured for use by the wireless device in a second cell group for multi-connectivity operation partially overlap in time with one another;
upon determining that the first DRX ON duration and the second DRX ON duration partially overlap in time with one another, take one or more actions that mitigate the partial overlap between the first DRX ON duration in the first DRX cycle configured for use by the wireless device in the first cell group and the second DRX ON duration in the second DRX cycle configured for use by the wireless device;
deciding to use only non-successive DRX ON durations in at least one of the first cell group and the second cell group such that partially overlapping DRX ON durations between the first and second DRX cycles of the first and second cell groups are avoided; and
changing between DRX states in at least one of the first DRX cycle and the second DRX cycle according to the decided use of only the non-successive DRX ON durations in the at least one of the first cell group and the second cell group.

14. A method of multi-connectivity operation of a network node for a wireless device in Discontinuous Reception, DRX, comprising:
adapting one or more parameters of a first DRX cycle configured for use by the wireless device in a first cell group for multi-connectivity operation such that a partial overlap between a first DRX ON duration in the first DRX cycle and a second DRX ON duration in a second DRX cycle configured for use by the wireless device in a second cell group for multi-connectivity operation is avoided, wherein adapting one or more parameters of the first DRX cycle comprises deciding to use only non-successive DRX ON durations in the first cell group such that the partially overlap is avoided; and
configuring the wireless device with the one or more parameters for the first DRX cycle.

15. The method of claim 14 wherein adapting the one or more parameters of the first DRX cycle configured for use by the wireless device in the first cell group comprises adapting the one or more parameters of the first DRX cycle configured for use by the wireless device in the first cell group in a coordinated manner with adaptation, by a second network node, of one or more parameters of the second DRX cycle configured for use by the wireless device in the second cell group for multi-connectivity operation.

16. The method of claim 14 wherein adapting the one or more parameters of the first DRX cycle configured for use by the wireless device in the first cell group comprises adapting the one or more parameters of the first DRX cycle configured for use by the wireless device in the first cell group such that DRX ON durations in the first DRX cycle are fully time-aligned with DRX ON durations in the second DRX cycle.

17. The method of claim 14 wherein a periodicity of the first DRX cycle is greater than a periodicity of the second DRX cycle, and adapting the one or more parameters of the first DRX cycle configured for use by the wireless device in the first cell group comprises adapting the one or more parameters of the first DRX cycle configured for use by the wireless device in the first cell group such that DRX ON durations of the first DRX cycle are fully time-aligned with a subset of DRX ON durations of the second DRX cycle.

18. The method of claim 14 wherein adapting the one or more parameters of the first DRX cycle configured for use by the wireless device in the first cell group comprises adapting the one or more parameters of the first DRX cycle configured for use by the wireless device in the first cell group such that DRX ON durations in the first DRX cycle are fully non-overlapping, in time, with DRX ON durations in the second DRX cycle.

19. The method of claim 14 wherein the first cell group and the second cell group are non-synchronized cell groups with respect to a received time difference of signals between subframe boundaries of the first cell group and the second cell group at the wireless device in multi-connectivity operation.

20. The method of claim 14 wherein the first cell group and the second cell group are synchronized with respect to the received time difference of signals between subframe boundaries of the first cell group and the second cell group at the wireless device in multi-connectivity operation.

21. A network node enabled to provide multi-connectivity operation for a wireless device in Discontinuous Reception, DRX, comprising:
    a transceiver;
    a processor; and
    memory containing instructions that are executable by the processor whereby the network node is operable to:
        adapt one or more parameters of a first DRX cycle configured for use by the wireless device in a first cell group for multi-connectivity operation such that a partial overlap between a first DRX ON duration in the first DRX cycle and a second DRX ON duration in a second DRX cycle configured for use by the wireless device in a second cell group for multi-connectivity operation is avoided, wherein adapting one or more parameters of the first DRX cycle comprises deciding to use only non-successive DRX ON durations in the first cell group such that the partially overlap is avoided; and
        configure the wireless device with the one or more parameters for the first DRX cycle.

\* \* \* \* \*